United States Patent
Tanimura et al.

(10) Patent No.: US 8,576,291 B2
(45) Date of Patent: Nov. 5, 2013

(54) DRIVE UNIT, MOVABLE MODULE, AND AUTOFOCUS CONTROL METHOD

(75) Inventors: Yasutaka Tanimura, Nara (JP); Takeshi Aoi, Nishinomiya (JP); Yoshihiro Hara, Takatsuki (JP); Natsuko Shiota, Ibaraki (JP)

(73) Assignee: Konica Minolta Opto, Inc., Tokyo (JP)

( * ) Notice: Subject to any disclaimer, the term of this patent is extended or adjusted under 35 U.S.C. 154(b) by 17 days.

(21) Appl. No.: 13/454,655

(22) Filed: Apr. 24, 2012

(65) Prior Publication Data

US 2012/0206615 A1    Aug. 16, 2012

Related U.S. Application Data

(62) Division of application No. 12/115,025, filed on May 5, 2008, now Pat. No. 8,189,093.

(30) Foreign Application Priority Data

May 9, 2007   (JP) ................................. 2007-124351

(51) Int. Cl.
    *H04N 5/228*      (2006.01)
    *H04N 5/232*      (2006.01)

(52) U.S. Cl.
    USPC ................ 348/208.99; 348/208.1; 348/208.2; 348/208.6; 348/208.7; 348/357

(58) Field of Classification Search
None
See application file for complete search history.

(56) References Cited

U.S. PATENT DOCUMENTS

| | | | |
|---|---|---|---|
| 4,860,040 A | 8/1989 | Tamamura et al. | |
| 4,884,557 A | 12/1989 | Takehana et al. | |
| 4,977,886 A | 12/1990 | Takehana et al. | |
| 6,516,146 B1 | 2/2003 | Kosaka | |
| 7,561,202 B2 * | 7/2009 | Goto | 348/357 |
| 8,174,608 B2 * | 5/2012 | Hara et al. | 348/357 |
| 2006/0209195 A1 | 9/2006 | Goto | |
| 2006/0272328 A1 * | 12/2006 | Hara et al. | 60/527 |
| 2007/0047938 A1 | 3/2007 | Suzuki et al. | |

(Continued)

FOREIGN PATENT DOCUMENTS

| | | |
|---|---|---|
| EP | 1 640 757 | 3/2006 |
| EP | 1 990 620 | 11/2008 |

(Continued)

OTHER PUBLICATIONS

Japanese Notice of Reasons for Refusal dated Jun. 21, 2011, for counterpart Japanese Application No. 2007-124351, together with an English translation thereof.

(Continued)

*Primary Examiner* — Lin Ye
*Assistant Examiner* — John H Morehead, III
(74) *Attorney, Agent, or Firm* — Cozen O'Connor

(57) ABSTRACT

To provide a drive unit and a drive module which include a shape memory alloy as a drive source to move a driven member and are capable of the high-precision movement of the driven member to a reference position. A drive unit and a drive module can be provided by controlling, in the drive unit and the drive module which include the shape memory alloy as the drive source to move the driven member, the shape memory alloy so that the resistance of the shape memory alloy is equal to the resistance when the driven member is located at the reference position.

14 Claims, 20 Drawing Sheets

(56) References Cited

U.S. PATENT DOCUMENTS

| | | | |
|---|---|---|---|
| 2007/0109412 A1* | 5/2007 | Hara | 348/207.1 |
| 2008/0143867 A1 | 6/2008 | Shirota | |
| 2008/0180811 A1 | 7/2008 | Nishimura | |
| 2008/0247741 A1 | 10/2008 | Yasuda | |
| 2008/0278030 A1 | 11/2008 | Hara et al. | |
| 2008/0278590 A1* | 11/2008 | Tanimura et al. | 348/208.99 |

FOREIGN PATENT DOCUMENTS

| | | |
|---|---|---|
| JP | 01-264795 | 10/1989 |
| JP | 04-340110 | 11/1992 |
| JP | 2001-142105 | 5/2001 |
| JP | 2001-263221 | 9/2001 |
| JP | 2002-130114 | 5/2002 |

OTHER PUBLICATIONS

Extended European Search Report dated Nov. 2, 2010, for counterpart European Application No. 08008509.5.

* cited by examiner

| FEED-OUT POSITION TABLE ZT | | | | | | | |
|---|---|---|---|---|---|---|---|
| n | 1 | ••• | k-1 | k | k+1 | ••• | nt |
| Rtg(n) | Rinf | ••• | Rtg(k-1) | Rtg(k) | Rtg(k+1) | ••• | Rnt |
| Is(n) | Iinf | ••• | Is(k-1) | Is(k) | Is(k+1) | ••• | Int |

FIG. 9
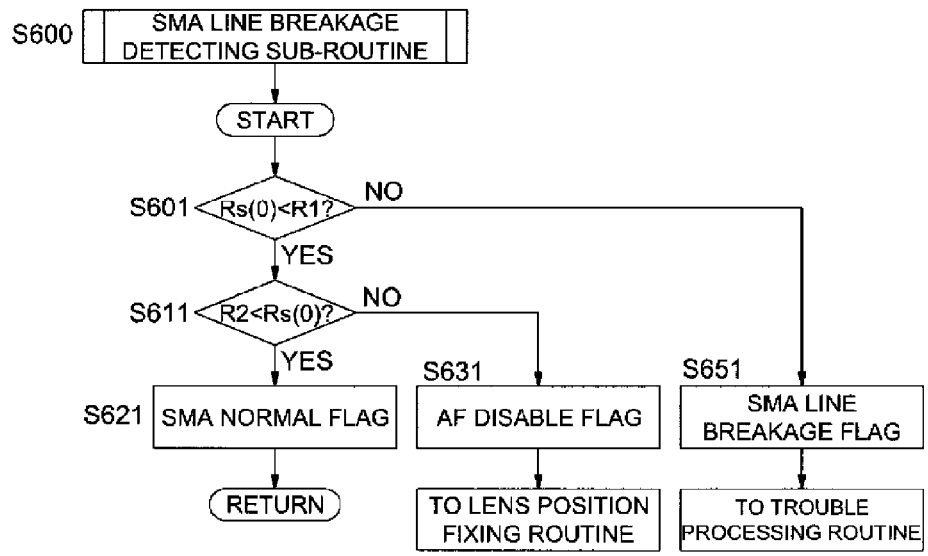
FIG. 10a
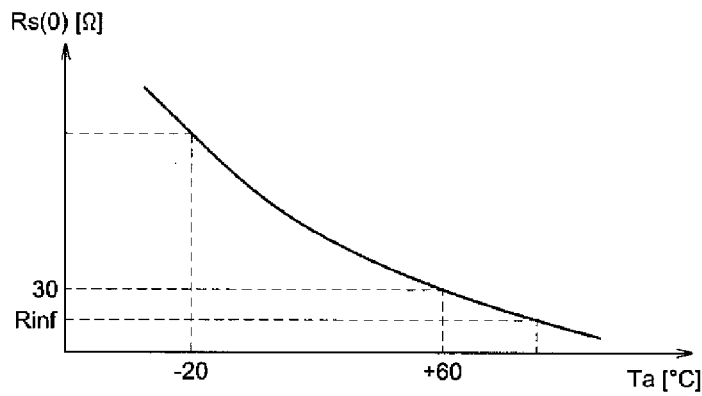
FIG. 10b
| AMBIENT TEMPERATURE TABLE TaT | | | | | | |
|---|---|---|---|---|---|---|
| Rs(0)(Ω) | 35 | 34 | 33 | 32 | 31 | 30 |
| Ta(°C) | -20 | -10 | +3 | +18 | +36 | +60 |

FIG. 14

| SETTLING TIME TABLE STT | | | | | | |
|---|---|---|---|---|---|---|
| Ta=-20°C | | | | | | |
| n | 1 | ... | k-1 | k | ... | nt |
| tst(n) | tst(1) | ... | tst(k-1) | tst(k) | ... | tst(nt) |

| Ta=+20°C | | | | | | |
|---|---|---|---|---|---|---|
| n | 1 | ... | k-1 | k | ... | nt |
| tst(n) | tst(1) | ... | tst(k-1) | tst(k) | ... | tst(nt) |

| Ta=+60°C | | | | | | |
|---|---|---|---|---|---|---|
| n | 1 | ... | k-1 | k | ... | nt |
| tst(n) | tst(1) | ... | tst(k-1) | tst(k) | ... | tst(nt) |

FIG. 17

| HYSTERESIS CORRECTION TABLE HCT | | | | | | |
|---|---|---|---|---|---|---|
| Ta=-20°C | | | | | | |
| n | 1 | ••• | k-1 | k | ••• | nt |
| Rcor(n) | Rcor(1) | ••• | Rcor(k-1) | Rcor(k) | ••• | Rcor(nk) |
| Icor(n) | Icor(1) | ••• | Icor(k-1) | Icor(k) | ••• | Icor(nk) |

| Ta=+20°C | | | | | | |
|---|---|---|---|---|---|---|
| n | 1 | ••• | k-1 | k | ••• | nt |
| Rcor(n) | Rcor(1) | ••• | Rcor(k-1) | Rcor(k) | ••• | Rcor(nk) |
| Icor(n) | Icor(1) | ••• | Icor(k-1) | Icor(k) | ••• | Icor(nk) |

| Ta=+60°C | | | | | | |
|---|---|---|---|---|---|---|
| n | 1 | ••• | k-1 | k | ••• | nt |
| Rcor(n) | Rcor(1) | ••• | Rcor(k-1) | Rcor(k) | ••• | Rcor(nk) |
| Icor(n) | Icor(1) | ••• | Icor(k-1) | Icor(k) | ••• | Icor(nk) |

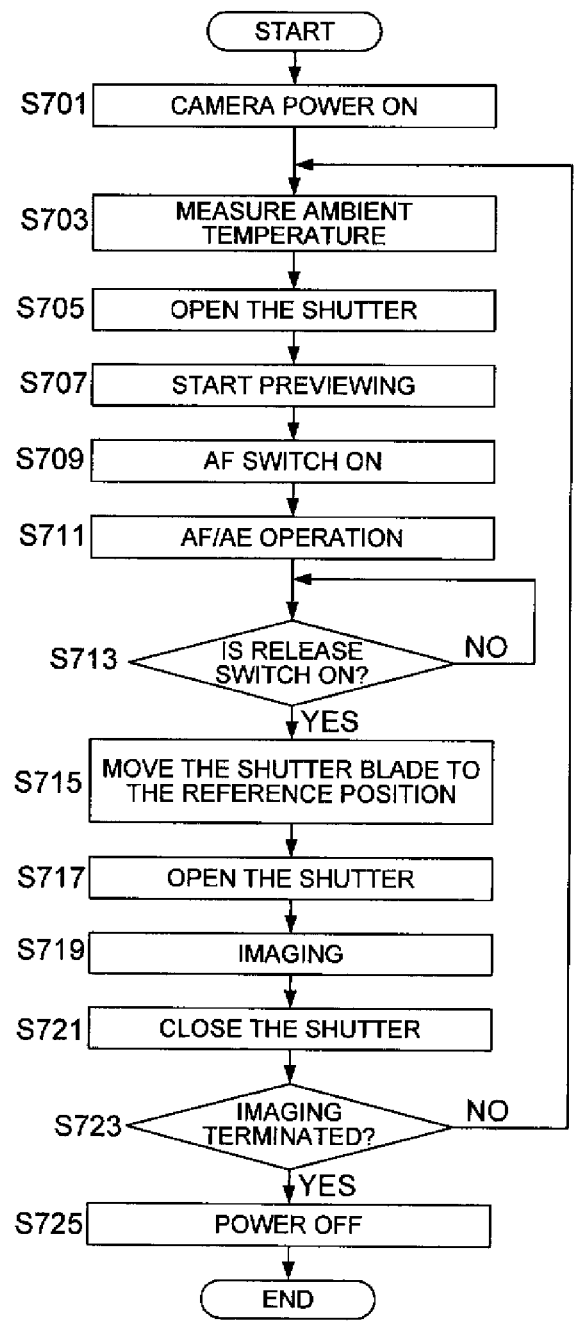

DRIVE UNIT, MOVABLE MODULE, AND AUTOFOCUS CONTROL METHOD

This application is based on Japanese Patent Application No. 2007-124351 filed on May 9, 2007, in Japanese Patent Office, the entire content of which is hereby incorporated by reference.

TECHNICAL FIELD

The present invention relates to a drive unit and drive module, particularly to a drive unit wherein a shape memory alloy is used as a drive source.

BACKGROUND

In recent years, a personal apparatus represented by a mobile phone has been equipped with a digital camera function as a standard function. In this situation, an increasing demand for a smaller camera module has been raised. In the meantime, the camera module is required to meet the heavy demands for more and more sophisticated functions such as an auto-focusing function and image stabilizing function. An actuator for driving the optical system is essential to implement the sophisticated functions of the camera module. An actuator for the sophisticated functions while meeting the requirements for more compact and lightweight configuration attracts attention.

In this situation, an actuator using a shape memory alloy is attracting attention. The shape memory alloy is typically represented by a titanium-nickel alloy, and can be defined as the alloy that, after having been subjected to deformation below a predetermined temperature, comes back to the original status due to martensite transformation by raising the temperature above that predetermined temperature. This property of the alloy is utilized to provide the performance of the actuator by heating.

When the aforementioned personal apparatus typically represented by a mobile phone is used for imaging operations, it is a common practice that the liquid crystal screen mounted on the apparatus is used as a camera finder. Thus, the framing is performed by viewing the preview image displayed on the liquid crystal screen when imaging operations are performed. To determine the framing, the focus of the preview image must be adjusted at a predetermined distance such as infinity.

However, in the conventional camera module, the auto-focusing function is not executed to focus the camera on a subject until the imaging is executed. Thus, when the preview image is displayed, the image focused on nowhere is displayed because the image taking lens is positioned at the position closer to the image pickup element (so-called over-infinite position) than infinity. This over-infinite position is provided to absorb the manufacturing errors and the fluctuation caused by temperature dependency in the focal distance of the image taking lens, and the manufacturing errors and the fluctuation caused by temperature dependency of the lens barrel.

To address these problems, a proposal has been made in a control apparatus using an actuator containing a shape memory alloy, taking a camera shutter unit and image stabilizing unit as examples. According to this proposal, the driven member is moved to a predetermined reference position by applying a standby current to the shape memory alloy to preheat it prior to the control of the driven member by the actuator (Unexamined Japanese Patent Application Publication No. 2001-263221). This technique can also be used to the aforementioned focus adjustment.

SUMMARY

The present invention was conceived in view of these problems. An object of the present invention therefore is to provide a drive unit and drive module wherein a shape memory alloy is used as a drive source to ensure easy and high-precision movement of the driven member to a reference position.

In view of forgoing, one embodiment according to one aspect of the present invention is a drive unit, comprising:

a shape memory alloy which is configured to move a driven member, which is biased in a first direction, in a second direction different from the first direction when the shape memory alloy is supplied with electric current;

a drive section for supplying the shape memory alloy with electric current;

a shape memory alloy resistance calculating section for calculating a resistance of the shape memory alloy when the shape memory alloy is supplied with the electric current by the drive section; and a control section for controlling, based on the resistance of the shape memory alloy calculated by the shape memory alloy resistance calculating section, the drive section to control the shape memory alloy to move the driven member to a reference position.

According to another aspect of the present invention, another embodiment is a drive module, comprising:

a driven member which is biased in a first direction;

a shape memory alloy which is configured to move the driven member in a second direction different from the first direction when the shape memory alloy is supplied with electric current;

a drive section for supplying the shape memory alloy with electric current;

a shape memory alloy resistance calculating section for calculating a resistance of the shape memory alloy when the shape memory alloy is supplied with the electric current by the drive section; and a control section for controlling, based on the resistance of the shape memory alloy calculated by the shape memory alloy resistance calculating section, the drive section to control the shape memory alloy to move the driven member to a reference position.

BRIEF DESCRIPTION OF THE DRAWINGS

FIG. 9 is a flow chart showing the Step S600 "SMA status detection subroutine" of FIG. 8;

FIGS. 10a and 10b are drawings showing an example of the ambient temperature table;

FIG. 14 is a diagram showing an example of the settling time table;

FIG. 16 is a schematic chart showing the hysteresis between the feed-out position and the target SMA resistance when the imaging optical system is fed out and fed in;

FIG. 17 is a schematic diagram representing an example of the hysteresis correction table;

FIG. 19 is a flow chart showing an example of the flow of the operations when the shutter unit is used in a digital camera;

DETAILED DESCRIPTION OF THE PREFERRED EMBODIMENT

Figure 1:
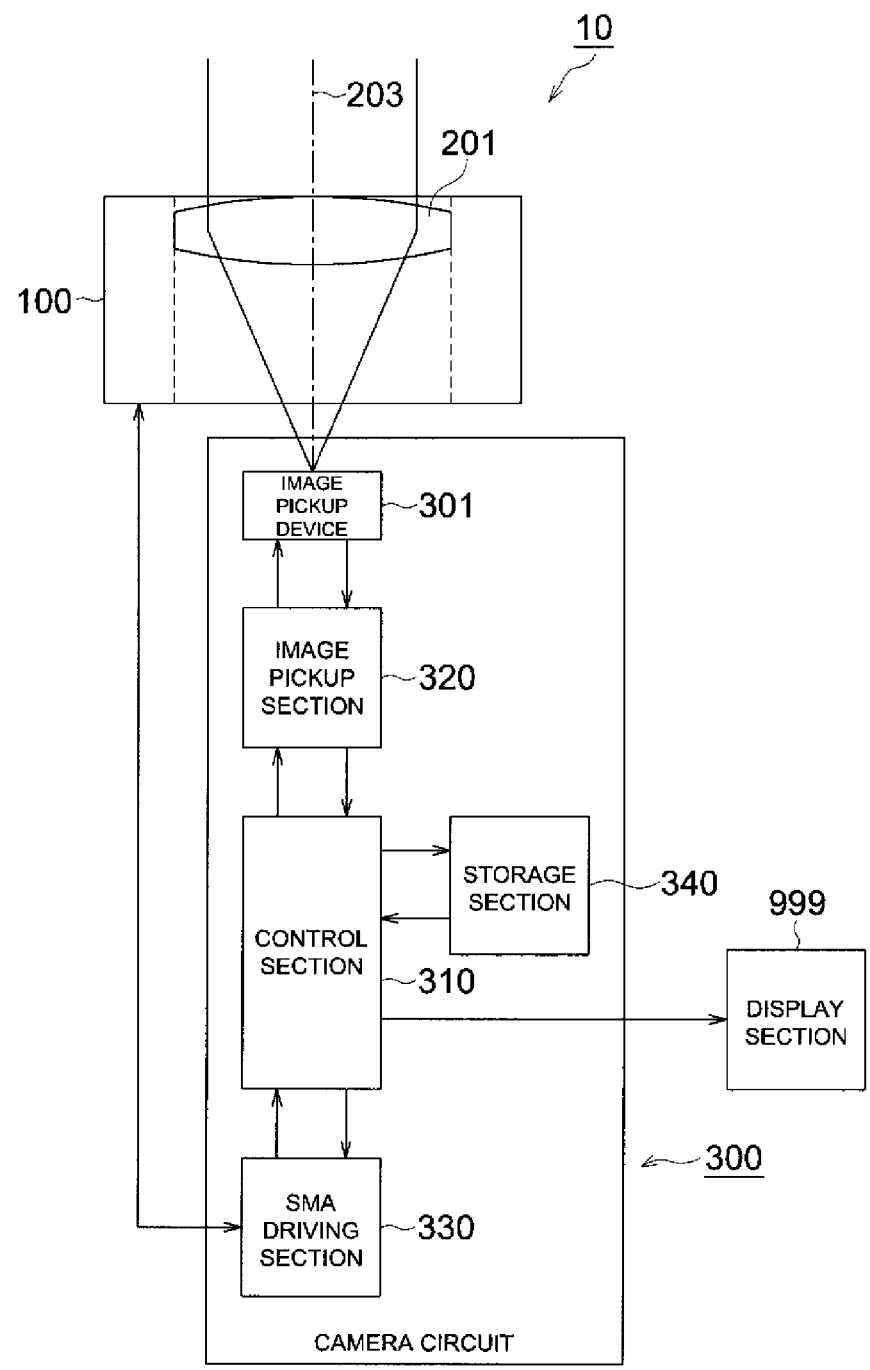
FIG. 1 is a block diagram representing an example of the image pickup apparatus as a first embodiment of the present invention.

The present invention is described based on the illustrated embodiments without being restricted thereto. The same or equivalent portions as those in the drawings will be assigned to the same numerals of reference, and will not be described again.

In the first place, a first embodiment of the present invention will be described with reference to FIGS. 1 through 17. FIG. 1 is a block diagram representing an example of the image pickup apparatus as the first embodiment of the present invention.

In FIG. 1, an image pickup apparatus 10 is a camera module built in a mobile phone, for example, and includes an imaging optical system 201, automatic focusing (hereinafter referred to as "AF") mechanism 100, and camera circuit 300. The camera circuit 300 contains an image pickup device 301, image pickup section 320, control section 310, storage section 340, SMA driving section 330 and others. The image pickup apparatus 10 is a drive module of the present invention, and the AF mechanism 100 and camera circuit 300 serves as a drive unit of the present invention.

The imaging optical system 201 forms an optical image of a subject on the imaging surface of the image pickup device 301. The AF mechanism 100 adjusts the focus by moving the imaging optical system 201 in the direction of an optical axis 203. The AF mechanism 100 is provided with a wire-shaped shape memory alloy (hereinafter referred to as "SMA") as a drive source for moving the imaging optical system 201. The AF mechanism 100 will be described with reference to FIGS. 2a, 2b and 2c and beyond.

The optical image of the subject formed on the imaging surface of the image pickup device 301 is subjected to photoelectric conversion by the image pickup device 301, and is converted into the digital image data by the image pickup section 320. The image data prior to image capturing operation is displayed as a moving image for previewing on the display section 999 through the control section 310. The captured image data is stored in a storage section 340 comprised of memories and others, through the control section 310, and is displayed as a captured image on the display section 999 when required. The display section 999 can be represented by the liquid display screen of a mobile phone, for example.

The image pickup section 320 controls the operation of the image pickup device 301 to obtain the aforementioned image data. In collaboration with the control section 310, the image pickup section 320 performs the process of focus detection to get focus information (hereinafter referred to as "AF data AFD"), using the image data of the pixels (hereinafter referred to as "AF pixels") located in part of the area (hereinafter referred to as "AF area") on the imaging surface of the image pickup device 301.

The SMA driving section 330 provides the control of current supply to the SMA, whereby the drive of the AF mechanism 100 is controlled. The SMA driving section 330 moves the imaging optical system 201 in the direction of the optical axis 203, whereby the focus of the imaging optical system 201 is adjusted. The SMA driving section 330 will be described in details with reference to FIG. 6. The aforementioned focus detection together with focus adjustment will be referred to as an AF operation.

The control section 310 is made up of a microcomputer and others, and controls the imaging operation by the aforementioned image pickup device 301 and image pickup section 320, and the overall operation of the image pickup apparatus 10 including the AF operation. The control section 310 can be a microcomputer that controls equipment, such as a mobile phone, incorporating the image pickup apparatus 10.

Figure 2A:
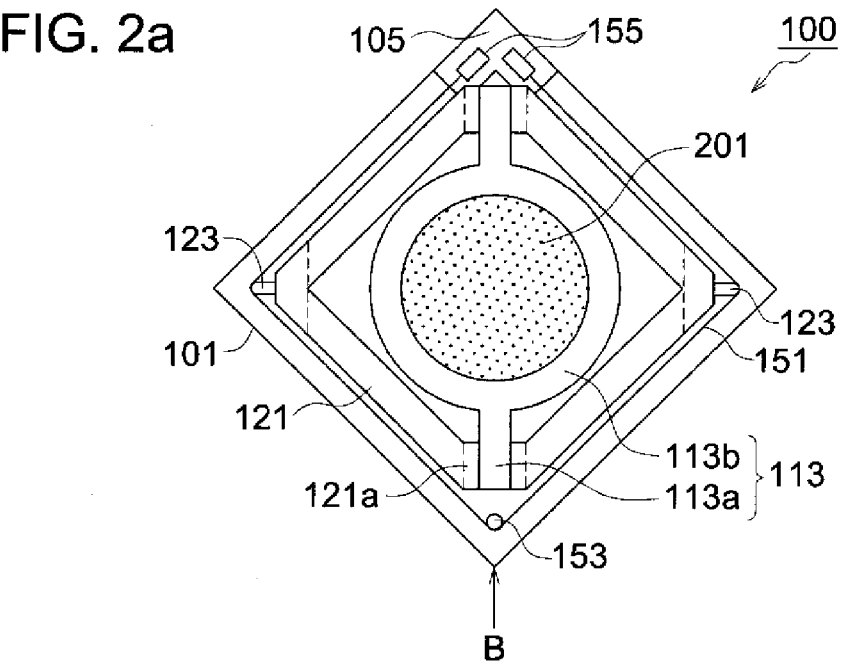
FIGS. 2a, 2b and 2c are schematic diagrams showing an example of the major structure of an AF mechanism.
Figure 2B:
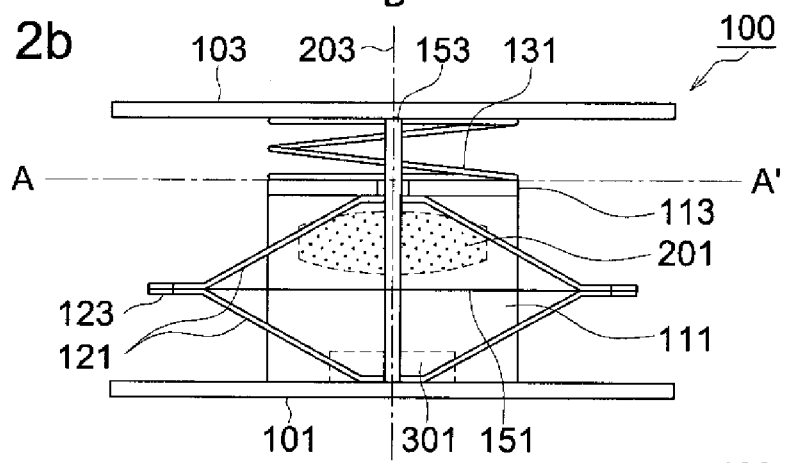
Figure 2C:
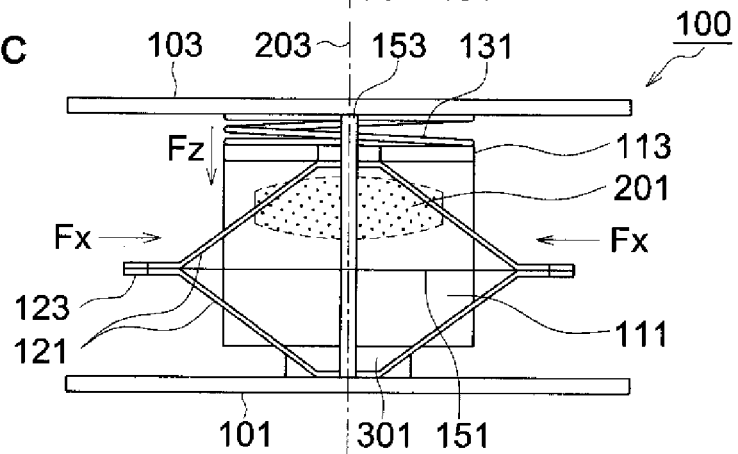

The following describes the structure and operation of the aforementioned AF mechanism 100 with reference to FIGS. 2a, 2b and 2c and FIG. 6. FIGS. 2a, 2b and 2c are the schematic diagrams showing an example of the structure and operation of the major components of the AF mechanism 100. FIG. 2a is a top view of the AF mechanism 100 taken along the plane A-A' perpendicular to the optical axis 203 of FIG. 2b. FIG. 2b is a side view of the AF mechanism 100 as viewed from direction B in FIG. 2a.

In FIGS. 2a, 2b and 2c, the AF mechanism 100 is made of a base plate 101, top plate 103, SMA support member 105, lens barrel 111, lens drive frame 113, SMA 151, tension guide 153, SMA fixing member 155, bias spring 131, drive arm 121 and displacement input section 123. The imaging optical system 201 is fixed inside the lens barrel 111. The image pickup device 301 is arranged on the base plate 101 in this example, but this is not essential. It is sufficient only if it is arranged at the focus position of the imaging optical system 201.

In FIG. 2a, the SMA 151 is formed like a wire having a diameter of about several tens of microns, and is extended on the two displacement input sections 123 and the tension guide 153 mounted on the drive arm 121. Both ends of the SMA 151, being stretched by a predetermined tension, are fixed onto the SMA support member 105 by caulking or other method through the two SMA fixing members 155 serving also as electrodes.

Each of two beams 131a of the lens drive frame 113 is mounted on the two flat portions 121a of the drive arm 121, and the movement of the flat portion 121a of the drive arm 121 is transmitted to the lens drive frame 113. An annular portion 113b of the lens drive frame 113 is biased by the bias spring 131 from the nearest side of the paper surface to the furthest side in FIG. 2a. This allows the beam 113a of the lens drive frame 113 to be pressed against the flat portion 121a of the drive arm 121.

FIG. 2b shows the situation where electric current is not applied to the SMA 151. The lens barrel 111 is integrally formed with the lens drive frame 113 into one piece by adhesion or similar method. It is biased downwardly from the top of the paper in the direction of the optical axis 203 by the bias spring 131 as a bias member of the present invention, and is pressed against the base plate 101. The drive arm 121 is biased downwardly from the top of the paper in the direction of the optical axis 203 by means of two flat portions 121a and two beams 131a of the lens drive frame 113 by the bias spring 131.

FIG. 2c shows the situation where the electric current is applied to the SMA 151. The drive arm 121 has a so-called pantograph structure. When current flows into the SMA 151, the length of the SMA 151 is reduced, and this force of reduction acts on the two displacement input sections 123 and is converted into a compression force Fx for compressing the drive arm 121.

The compression force Fx allows the drive arm 121 to press the lens barrel 111 and lens drive frame 113 upwardly from the bottom of the paper in the direction of the optical axis 203 through the two flat portions 121a and two beams 131a against the biasing force Fz by the aforementioned bias spring 131. Thus, the imaging optical system 201 is fed out upwardly from the bottom of the paper in the direction of optical axis 203 namely, from the infinite side to the closest side.

As described above, the SMA 151 and bias spring 131 serves as an actuator to drive the imaging optical system 201 through the lens barrel 111, lens drive frame 113 and drive arm 121. In this case, the imaging optical system 201 is a driven member of the present invention.

Figure 3A:
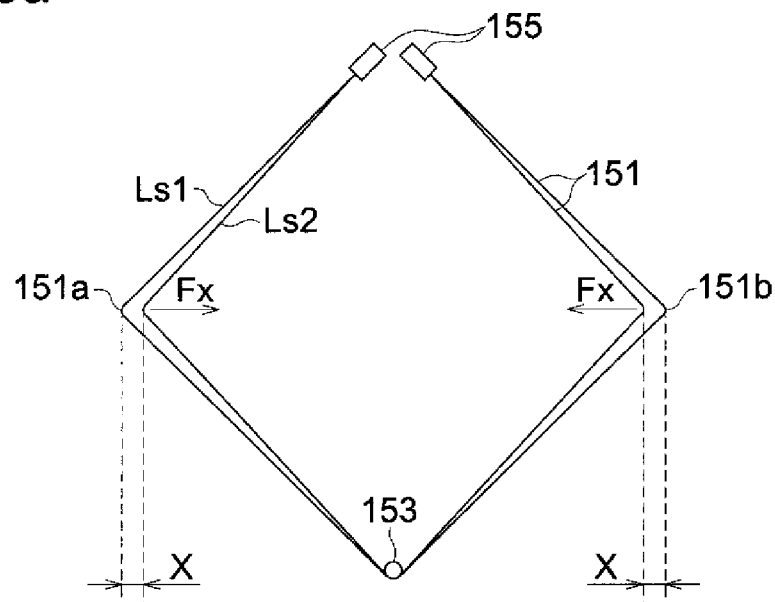
FIGS. 3a and 3b are schematic diagrams showing the relationship between the SMA and a drive arm.
Figure 3B:
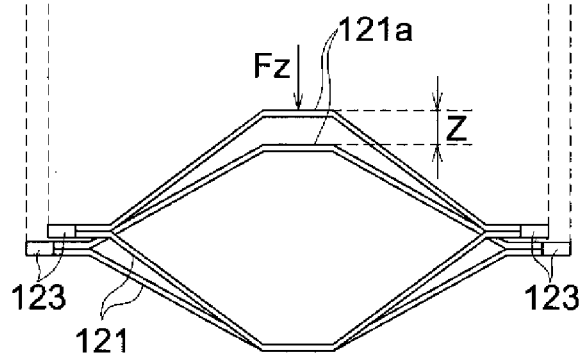

The following describes the relationship between the SMA 151 and drive arm 121 with reference to FIGS. 3a and 3b and FIGS. 4a, 4b and 4c. FIGS. 3a and 3b are schematic diagrams showing the relationship between the SMA 151 and drive arm 121. FIG. 3a represents the operation of the SMA 151, and FIG. 3b shows the operation of the drive arm 121.

In FIG. 3a, assume that the SMA 151 contracts in length from length Ls1 to length Ls2. Both ends of the SMA 151 fixed onto the SMA fixing members 155 and the center hitched by the tension guide 153 cannot be moved. Thus, a change in the length of the SMA 151 makes the positional change X in the position of the portions 151a and 151b wherein the SMA 151 is kept in contact with the displacement input section 123 of the drive arm 121. The positional change X allows the aforementioned compression force Fx to be applied to the displacement input section 123.

In FIG. 3b, in response to the compression force Fx, each of the two displacement input sections 123 of the drive arm 121 is pushed inwardly in the pantograph shape by "X". Then the drive arm 121 is deformed, and the flat portions 121a of the drive arm 121 are pushed upwardly by the moving distance Z from the bottom of the paper in FIG. 3b against the biasing force Fz of the bias spring 131.

Figure 4A:
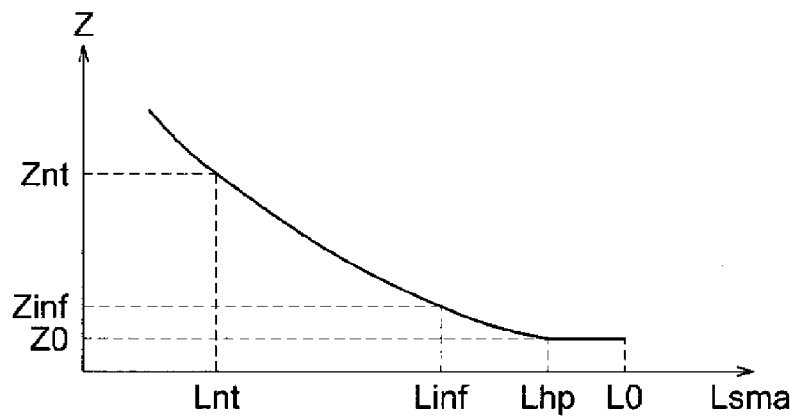
FIGS. 4a, 4b and 4c are schematic diagrams showing the relationship between the feed-out distance of the imaging optical system and the characteristics of the SMA.
Figure 4B:
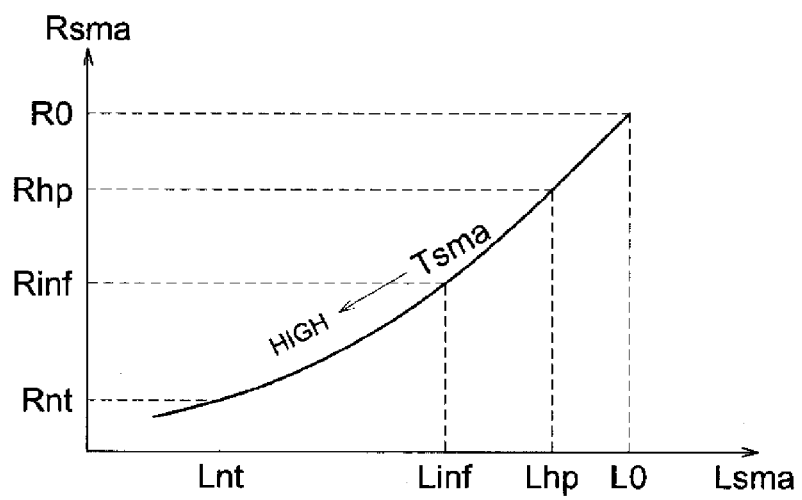
Figure 4C:
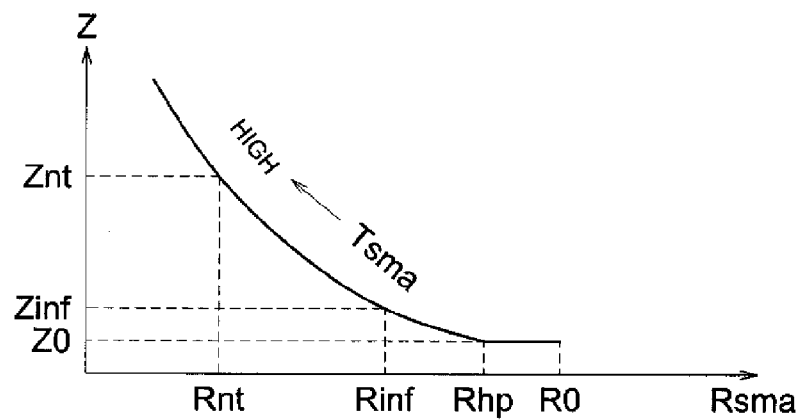

FIGS. 4a, 4b and 4c are the charts representing the relationship between the moving distance Z of the aforementioned drive arm 121—i.e., the feed-out distance Z of the imaging optical system 201—and the characteristics of the SMA 151. FIG. 4a shows the relationship between the feed-out distance Z and length Lsma of the SMA 151. FIG. 4b shows the relationship between the length Lsma of the SMA 151 and the resistance Rsma. FIG. 4c shows the relationship between the feed-out distance Z and the resistance Rsma of the SMA 151.

In FIG. 4a, the relationship between the moving distance Z of the aforementioned drive arm 121—i.e., the feed-out distance Z of the imaging optical system 201—and the characteristics of the SMA 151 can be expressed as a 1-to-1 relationship although it is nonlinear, without depending on the ambient temperature Ta of the SMA 151. Assume that the length of the SMA 151 is Lsma=L0 when drive current is not applied to the SMA 151, and the feed-out distance Z=Z0 in this case. When the drive current is applied to the SMA 151, and heat is generated by the SMA 151, the length Lsma of the SMA 151 is reduced, and, as shown in FIGS. 3a and 3b, the compression force Fx of the SMA 151 is generated to push the drive arm 121 upward. However, since the biasing force Fz of the bias spring 131 is greater until the SMA length Lsma becomes to be Lhp, the feed-out distance Z remains unchanged being z0.

When the drive current is further increased so that the SMA 151 length Lsma is equal to or less than Lhp, the compression force Fx of the SMA 151 is increased to be greater than the biasing force Fz of the bias spring 131. Thus, the drive arm 121 is pushed upwardly. Assume the feed-out distance Z is Zinf for focusing the imaging optical system 201 at infinity, and SMA 151 length Lsma is Linf at this time. Also assume the feed-out distance Z is Znt for focusing the imaging optical system 201 at the closest distance, and the SMA 151 length Lsma is Lnt at this time. The area where the feed-out distance Z is from Z0 to Zinf corresponds to the area where focusing cannot be achieved by the imaging optical system 201 (hereinafter referred to as "over-infinity area").

In FIG. 4b, assume the SMA 151 resistance Rsma is R0 when the drive current is not applied to the SMA 151, namely, when SMA 151 length Lsma=L0. When the drive current is applied to the SMA 151, the SMA 151 generates heat using the Joule heat resulting from the resistance Rsma of the SMA 151. Thus, the SMA 151 temperature Tsma is raised. In the case where the SMA 151 is independent, when SMA 151 temperature Tsma is raised and when the SMA 151 length Lsma has started to be reduced, the SMA 151 resistance Rsma increases at first. When the length has been reduced below a predetermined level, the SMA 151 resistance Rsma starts to reduce.

However, in the system such as in the AF mechanism 100 wherein the biasing force Fz is always applied to the SMA 151 by the bias spring 131, the aforementioned turnover of the change in resistance is hardly observed. A 1-to-1 relationship (although this is nonlinear) is known to be held between the SMA 151 length Lsma and the resistance Rsma, without depending on the ambient temperature Ta of the SMA 151.

It is assumed that the SMA 151 resistance Rsma is Rhp when SMA 151 length Lsma is Lhp. Similarly, it is assumed that the resistance Rsma is Rinf when SMA 151 length Lsma is Linf for focusing the imaging optical system 201 at infinity. It is also assumed that the resistance Rsma is Rnt when SMA 151 length Lnt for focusing the imaging optical system 201 at the closest distance.

In FIG. 4c, from the relationship discussed with reference to FIG. 4a and FIG. 4b, a 1-to-1 relationship (although this is nonlinear) is held between the feed-out distance Z of the imaging optical system 201 and the resistance Rsma of the SMA 151, without depending on the ambient temperature Ta of the SMA 151. When the electric current is applied to the SMA 151, and heat is generated, the resistance Rsma of the SMA 151 is reduced, and the length Lsma is also reduced, while the feed-out distance Z is increased. To be more specific, the imaging optical system 201 is fed out from the infinity side to the closest side. While the resistance Rsma of the SMA 151 is in the range of R0 to Rhp, the biasing force Fz of the bias spring is greater than compression force Fx of the SMA 151. Thus, the feed-out distance Z remains unchanged being z0.

While the SMA 151 resistance Rsma is Rhp through Rinf, the imaging optical system 201 is located in the over-infinity area wherein focusing is disabled. The focusing of the imaging optical system 201 is enabled while Rsma is Rinf through Rnt. The area where Rsma is less than Rnt corresponds to the area wherein focusing is achieved at a position still closer than the closest distance. In this area, sufficient optical properties cannot usually be obtained due to the aberration of the imaging optical system 201 and a matter of peripheral light.

As shown in FIG. 4c, a 1-to-1 relationship (although not linear) is held between the moving distance of the drive arm 121, i.e., the feed-out distance Z of the imaging optical system 201 and resistance Rsma of the SMA 151, without depending on the ambient temperature Ta of the SMA 151. To be more specific, if control is provided so that the resistance of the SMA 151 will be equal to a predetermined resistance, the focused position of the imaging optical system 201 can be controlled, without depending on the ambient temperature Ta of the SMA 151.

Figures 5A, 5B:
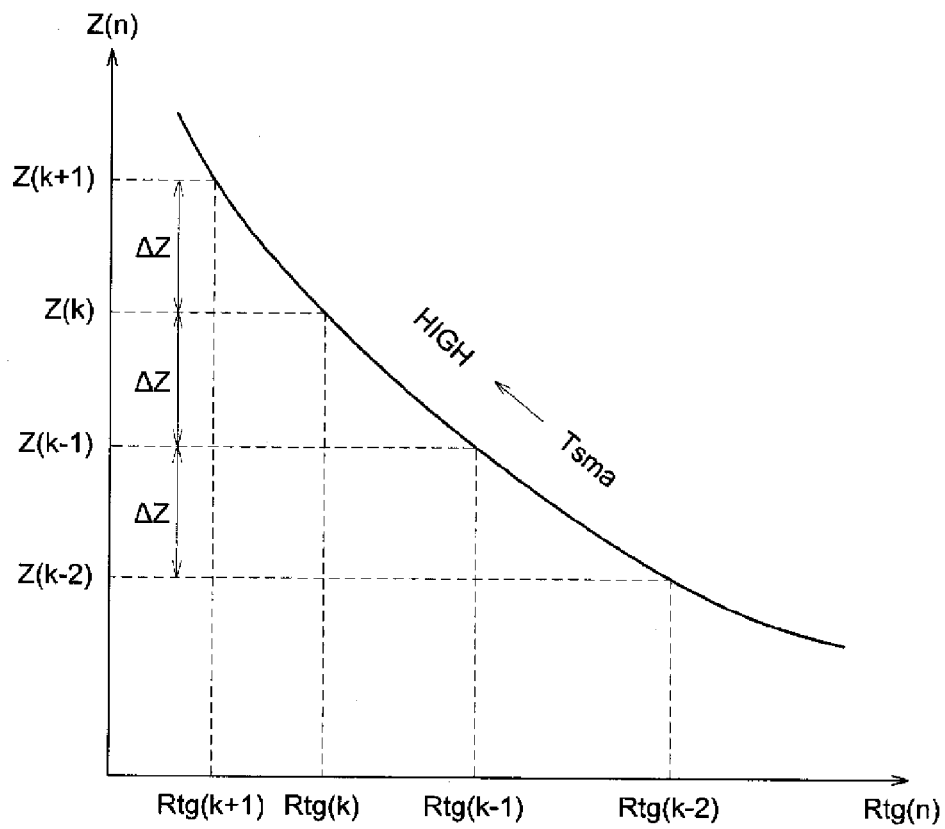
FIGS. 5a and 5b are schematic diagrams showing the relationship between the feed-out distance of the imaging optical system and the resistance of the SMA.

FIGS. 5a and 5b show the relationship between the feed-out distance Z of the imaging optical system 201 and the target resistance Rsma of the SMA 151. FIG. 5a is an enlarged view of a part of the range where Rsma is from Rinf to Rnt in the chart representing the relationship between the feed-out distance Z and target resistance Rsma in FIG. 4c. FIG. 5b shows an example of the Feed-out Position Table ZT showing the relationship of FIG. 5a.

In the present first embodiment, focusing operation of the imaging optical system 201 is assumed to be performed by the so-called step drive method wherein the imaging optical system 201 is fed out by equally spaced intervals. In this case, an AF step number n (where "n" is 0 (zero) or positive integer) is introduced as the parameter showing the feed-out position of the imaging optical system 201 in the step drive mode. The feed-out position of the imaging optical system 201 corresponding to the AF step number n is assumed as Z(n), and Rtg(n) is assumed as the target resistance to control the resistance Rsma of the SMA 151 when the imaging optical system 201 is to be driven to the feed-out position Z(n).

The relationship between the feed-out distance Z in FIG. 4c and the aforementioned feed-out position Z(n) can be rearranged as follows: The feed-out position Z(0) at AF step number n=0 (zero) corresponds to the initial position Z0 wherein electric current is not applied to the SMA 151. Similarly, the feed-out position Z(1) with AF step number n of 1 is the infinite position Zinf for focusing the imaging optical system 201 at the infinity. The feed-out position Z(nt) with AF step number n of nt is the closest position Znt for focusing the imaging optical system 201 at the closest distance.

In FIG. 5a, when imaging optical system 201 is assumed to be equidistantly fed out by an increments ΔZ, for example, positions Z(n) of imaging optical system 201 at AF step number n=k−2, k−1, k and k+1 are assumed as Z(k−2), Z(k−1), Z(k) and Z(k+1). In this case, the drive current Is(n) is applied to the SMA 151 to raise the temperature Tsma of the SMA 151, whereby, when the imaging optical system 201 is fed out, each of the target resistances Rtg(n) of the SMA 151 corresponding to each feed-out position Z(n) of the imaging optical system 201 is Rtg(k−2), Rtg(k−1), Rtg(k) and Rtg(k+1). Thus, a non-linear 1-to-1 relationship is held, without depending on the ambient temperature Ta of the SMA 151, as described with reference to FIG. 4c.

In FIG. 5b, the feed-out position Table ZT includes an AF step number n; a target resistance Rtg(n) of the SMA 151 for moving the corresponding imaging optical system 201 to each feed-out position Z(n); and a reference SMA drive current value Is(n) for forming the resistance Rs(n) of the SMA 151 into the target resistance Rtg(n).

n=1, namely, when the target resistance Rtg(1) for focusing the imaging optical system at the infinity is Rinf, the SMA drive current value Is(1) is Iinf, and when the target resistance Rtg(nt) for focusing the imaging optical system at the closest distance is Rnt, the SMA drive current value Is(nt) is Int. Similarly, n=k, namely, the target resistance is Rtg(k) for focusing the imaging optical system at the feed-out position z(k), the SMA drive current value is Is(k).

It should be noted, however, that the imaging optical system 201 have a depth of field depending on the focal distance and aperture value. For example, the infinite position Zinf may be set at the position which is nearer from the infinite position by the depth of field, and the resistance Rinf may be set smaller by the amount corresponding to the depth of field. Similarly, the closest position Znt may be set farther by the depth of field, and the resistance Rnt may be set higher by the amount corresponding to the depth of field.

The feed-out position Table ZT is prepared by a procedure where the target resistance Rtg(n) calculated at the time of adjusting the focus of the imaging optical system 201 and the SMA drive current value Is(n) supplied at that time are stored, for example. The feed-out position Table ZT is provided, for example, in the storage section 340 of FIG. 1, and is used in the flow chart of FIGS. 11 and 15.

However, the aforementioned feed-out position Table ZT is not restricted to it, and the table ZT may be made up of the target resistance Rs(n) and the approximate SMA drive voltage value Vs(n) for making the resistance of the SMA be that target resistance Rs(n).

Figure 6:
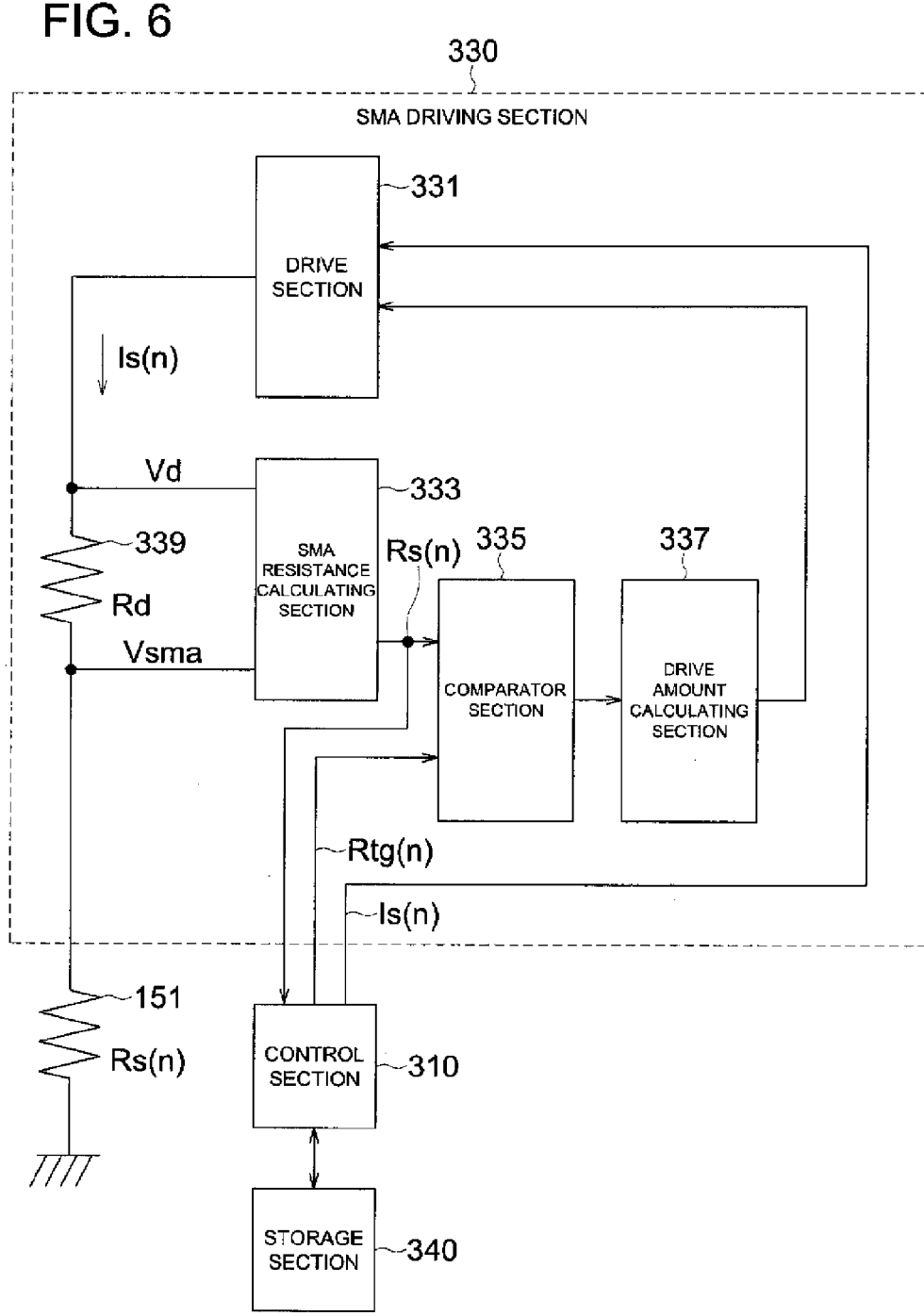
FIG. 6 is a block diagram showing an example of the circuit structure of the SMA driving section.

The following describes the method of detecting the resistance Rs(n) of the aforementioned SMA 151 with reference to FIG. 6. FIG. 6 is a block diagram showing an example of the circuit structure of the SMA driving section 330.

In FIG. 6, the SMA driving section 330 is made of a drive section 331, SMA resistance calculating section 333, comparator section 335, drive amount calculating section 337, reference resistor 339 and others. The operation of the SMA driving section 330 is controlled by the control section 310.

To start with, the value of the reference SMA drive current Is(n) stored in the feed-out position Table ZT of FIG. 5b in the storage section 340 is transmitted to the drive section 331 through the control section 310, and the SMA drive current Is(n) is applied to the SMA 151 by the drive section 331 through the reference resistor 339. As described above, instead of Is(n), the approximate SMA drive voltage value Vs(n) can be used to control the drive voltage.

The potentials Vd and Vsma at each side of the reference resistor 339 are inputted into the SMA resistance calculating section 333, and the present resistance Rs(n) of the SMA 151 is calculated from the potentials Vd and Vsma by the Formula 1 (to be described later).

The present resistance Rs(n) calculated by the SMA resistance calculating section 333 is inputted into one of the input terminals of the comparator section 335, and the target resistance Rtg(n) stored in the feed-out position Table ZT of FIG. 5b is inputted into the other terminal through the control section 310, whereby both of them are compared with each other. The comparison result by the comparator section 335 is inputted into the drive amount calculating section 337. The drive amount of the SMA 151 (the control value of the drive current Is(n) of drive section 331 in this example) is calculated from the current resistance Rs(n) of the SMA 151 and target resistance Rtg(n) and the result is fed back to the drive section 331.

The present resistance Rs(n) of the SMA 151 is obtained as follows: In the first place, assume that the resistance of the reference resistor 339 is Rd. Then the potential difference (Vd−Vsma) across the reference resistor 339 is:

$$Vd-Vsma=Is(n) \times Rd$$

From this equation, the present SMA drive current Is(n) is:

$$Is(n)=(Vd-Vsma)/Rd$$

Further, the potential on the bottom end of the reference resistor 339, i.e., the potential Vsma on the top end of the SMA 151 is:

$$Vsma=Is(n) \times Rs(n)$$

Thus, the current resistance Rs(n) of the SMA 151 is calculated from the above equations:

$$Rs(n)=Vsma/Is(n)=(Vsma/(Vd-Vsma)) \times Rd \quad \text{Formula 1}$$

Since the resistance Rd of the reference resistor 339 is known, the current resistance Rs(n) of the SMA 151 can be obtained by measuring the potential Vd across the reference resistor 339, and the Vsma.

Figure 7:
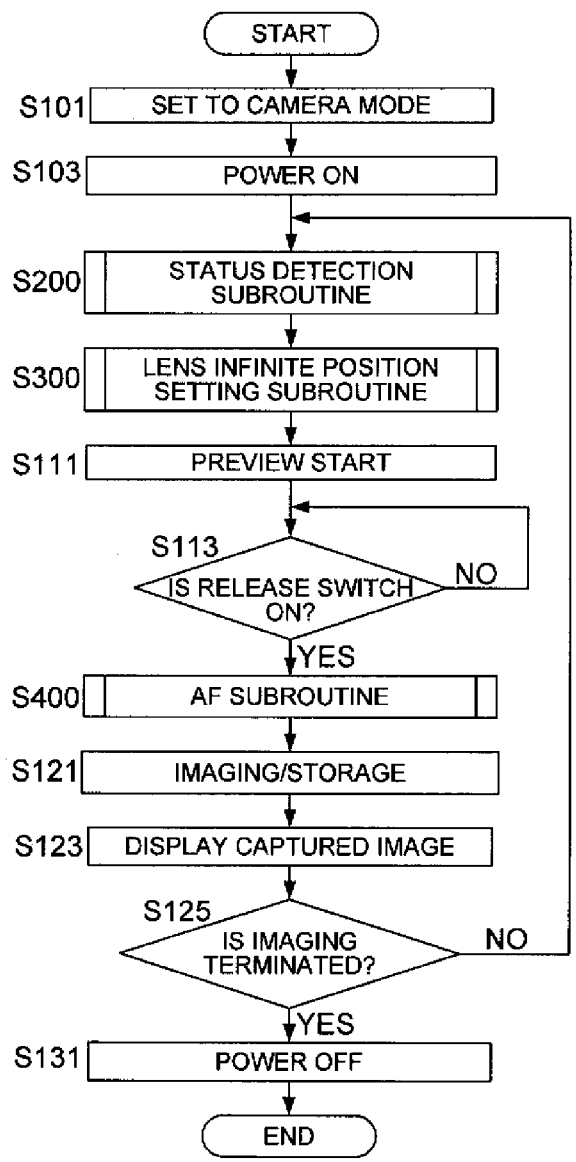
FIG. 7 is a diagram representing the main routine of the flow chart showing the flow of the movement of the image pickup apparatus.

The following describes the operation of the image pickup apparatus 10 as a first embodiment with reference to FIGS. 7 through 17. FIG. 7 is a diagram representing the main routine of the flow chart showing the image pickup apparatus 10.

In FIG. 7, when the user has performed the operation, for example, of setting the mobile phone to the camera mode in Step S101, the power of the image pickup apparatus 10 is turned on in Step S103, and Step S200 "status detection subroutine" is executed so that the status of the SMA 151 is verified to see whether or not there is any failure including a line breakage or short circuit of the SMA 151, and to check the ambient temperature Ta in the vicinity of the SMA 151 (status detection step). Step S200 "status detection subroutine" will be described later with reference to FIG. 8.

Then, Step S300 "lens infinite position setting subroutine" is executed and the imaging optical system 201 is set at the infinite position (lens infinite position setting step). In Step S111, the image pickup operation is started by the image pickup apparatus 10, and the display section 999 starts to display the preview image (preview step). The preview image displayed at the time is focused at infinity. Step S300 "lens infinite position setting subroutine" will be described later with reference to FIG. 11.

In Step S113, it is checked whether the release switch is turned on by the user or not. The system waits at Step S113 until the release switch is turned on (release detection step). When the release switch is turned on (Step S113: Yes), Step S400 "AF subroutine" is executed, and the imaging optical system 201 moves to the focused position of the subject (AF process). Step S400 "AF subroutine" will be described later with reference to FIG. 12.

The image pickup operation is performed in Step S121 (image pickup step). The captured image data is stored in the storage section 340 (image data storing step), and the captured image is displayed on the display section 999 in Step S123 when required (image display step). In Step S125, verification is made to determine if the image pickup operation is to be terminated or not (image pickup termination check process). If the imaging operation is not terminated (Step S125: No), the system goes back to Step S200 "status detection subroutine" wherein the status of the SMA 151 is checked. After that, the aforementioned operation is repeated.

Upon termination of the image pickup operation (Step S125: Yes), the power source of the image pickup apparatus 10 is turned off in Step S131, and a series of operations is terminated. The aforementioned operations of the image pickup apparatus 10 are controlled by the control section 310.

Figure 8:
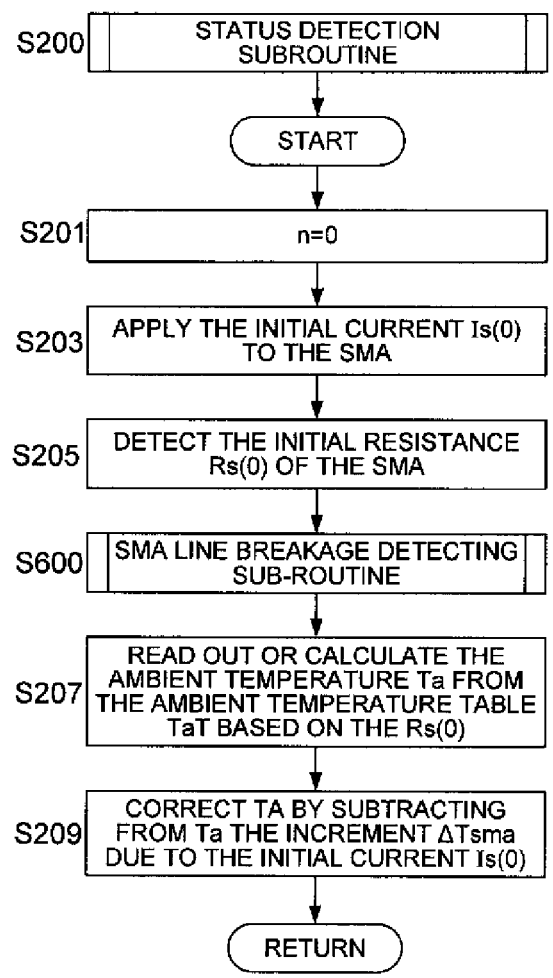
FIG. 8 is a flow chart showing the Step S200 "status detection subroutine" of FIG. 7.

FIG. 8 is a flow chart showing Step S200 "status detection subroutine" of FIG. 7;

As shown in FIG. 8, in Step S201, the AF step number n indicating the feed-out position of the imaging optical system 201 is set to "0 (zero)" indicating the initial position (the initial position parameter setting up step). In Step S203, a predetermined initial current Is(0) stored in the storage section 340 is applied to the SMA 151 (initial current application step). The initial current Is(0) is about several milliamperes, for example. When the initial current Is(0) is applied, the temperature Tsma of the SMA 151 gets higher than the ambient temperature Ta of the SMA 151, for example, the focus adjustment device of the imaging optical system 201 is provided with a function of detecting the increment ΔTsma of the temperature Tsma of the SMA 151, and the increment ΔTsma of the temperature Tsma at the time of adjusting the focus is stored in the storage section 340. Then correction can be made by the amount of ΔTsma.

In Step S205, the initial resistance Rs(0) of the SMA 151 is detected by the SMA resistance calculating section 333 using the aforementioned Formula 1 (initial resistance calculation step), wherein the resistance Rs(0) of the SMA 151 when drive current is not applied to the SMA 151 of FIGS. 4a, 4b and 4c is R0. It should be noted, however, that the time duration when a predetermined initial current Is(0) is applied can be the same as the time duration required to detect the initial resistance Rs(0) of the SMA 151 in Step S205.

Although details are described later with reference to FIG. 10a, it should be pointed out that, when drive current Is(n) is not applied to the SMA 151, the initial resistance Rs(0) has a one-to-one relation with the ambient temperature Ta of the SMA 151. Thus, the initial resistance Rs(0) of the SMA 151 having been detected by application of the initial current Is(0) can be considered to correspond to the sum of the ambient temperature Ta of the SMA 151 and the temperature increment ΔTsma resulting from initial current Is(0).

This is followed by the execution of Step S600 "SMA line breakage detecting sub-routine" to check whether or not there is any failure such as a line breakage or short circuit of the SMA 151 (SMA line breakage detecting step). Step S600 "SMA line breakage detecting sub-routine" will be described later with reference to FIG. 9. If the status of the SMA 151 is normal, the ambient temperature Ta is read out of the ambient temperature Table TaT (to be described later with reference to FIG. 10b) in Step S207 by the control section 310 based on the resistance Rs(0) of the SMA 151 detected in the Step S205. Alternatively, the ambient temperature Ta is calculated from the ambient temperature Table TaT (ambient temperature calculating step).

In Step S209, the temperature increase ΔTsma due to the initial current Is(0) stored in the storage section 340 is subtracted by the control section 310 from the ambient temperature Ta having been read out of the ambient temperature Table TaT in Step S207 or having been calculated (ambient temperature correction step). This procedure offsets the temperature increase due to the initial current Is(0), and the true ambient temperature Ta can be obtained. Then the system goes back to Step S200 of FIG. 7.

Alternatively, in Step S203, initial current Is(0) is reduced to such a small current that heat is hardly generated by the SMA 151 per se, whereby the temperature Tsma of the SMA 151 agrees with the ambient temperature Ta of the SMA 151. This procedure, if taken, will eliminate the need of offsetting the temperature increase ΔTsma due to the initial current Is(0), and hence will eliminate the use of the Step S209.

In this case, since the initial current Is(0) is very small, the potentials Vd and Vsma at each side of the reference resistor are very small. Thus, in order to improve the detection accuracy, a measure is preferably taken to increase the detection gain or the like of the SMA resistance calculating section 333. In this case, the control section 310 serves as a status detection section, line breakage detection section, temperature detection section and temperature correction section in the present invention. Further, the Is(0) may be a current with which the SMA keeps a martensite phase without transiting into an austenite phase.

It should be noted that detection of the ambient temperature Ta by Step S200 "status detection subroutine" is used to correct the temperature characteristics of the image pickup apparatus 10 and is preferably executed at every image pickup operation. However, if there is not a big change in ambient temperatures among imaging operations in the mode of continuously capturing a plurality of images, the ambient temperature Ta should be detected immediately before the first imaging operation.

FIG. 9 is a flow chart showing Step S600 "SMA line breakage detecting sub-routine" of FIG. 8. In this case, prior to the calculation of the ambient temperature Ta in Step S207 of FIG. 8, a measure is taken to check a trouble with the resistance resulting from the wire breakage or short circuit of the SMA 151.

In FIG. 9, verification is made in Step S601 to see whether or not the initial resistance Rs(0) of the SMA 151 detected in Step S205 of FIG. 8 is smaller than a predetermined resistance R1. If the initial resistance Rs(0) of the SMA 151 is equal to or greater than a predetermined resistance R1 (Step S601: No), the SMA 151 is determined to have been disconnected. Then an SMA disconnection flag is set in Step S651, and application of current to the SMA 151 is disabled, for example. The system goes to the "trouble processing routing" wherein a trouble handling process is taken, for example, by giving a visual display to notify the abnormal status or issuing an alarm sound. The details of the "trouble processing routing" will be described later.

When the initial resistance Rs(0) of the SMA 151 is smaller than a predetermined resistance R1 (Step S601: Yes), verification is made in Step S611 to check whether or not the initial resistance Rs(0) of the SMA 151 is greater than a predetermined resistance R2. When the initial resistance Rs(0) of the SMA 151 is equal to or smaller than a predetermined resistance R2 (Step S611: No), the SMA 151 is determined to have been short circuited or to be suffering from much current leakage, and an AF disable flag is set in Step S631. The system then goes to the "lens position fixing routine" wherein the imaging optical system 201 is moved to a predetermined fixed position (e.g., the regular focus position for focusing at a distance of several meters), for example, by other mechanical means. The details of the "lens position fixing routine" will not be described.

When the initial resistance Rs(0) of the SMA 151 is greater than a predetermined resistance R2 (Step S611: Yes), an SMA normal flag is set in Step S621, and the system goes to the Step S600 of FIG. 8.

The aforementioned predetermined resistances R1 and R2 are a resistance which is slightly greater than the range of resistance that can be taken by the SMA 151, and a resistance which is slightly smaller than the range of resistance that can be taken by the SMA 151, respectively, For example, if the resistance that can be taken by the SMA 151 is in the range of 30 through 35Ω, then R1=50Ω, and R2=20 Ω.

FIGS. 10a and 10b show the relationship between the initial resistance Rs(0) of the SMA 151 and the ambient temperature Ta of the SMA 151. FIG. 10a is a chart representing the relationship between the initial resistance Rs(0) and ambient temperature Ta. FIG. 10b shows an example of the ambient temperature Table TaT.

When electric current is not applied to the SMA 151, the initial length Ls(0) and initial resistance Rs(0) retain the one-to-one relationship as shown in FIG. 4b, and the relationship is known to be changed by the ambient temperature Ta of the SMA 151. Thus, the one-to-one relation also is held between the ambient temperature Ta and initial resistance Rs(0). FIG. 10a shows an example of this relationship. Here the relationship between the ambient temperature Ta and initial resistance Rs(0), wherein the ambient temperature Ta is plotted on the horizontal axis, with the initial resistance Rs(0) plotted on the vertical axis.

The initial resistance Rs(0) (30Ω in this example) at the maximum value (+60° C. in this example) of the ambient temperature Ta should be set at a level higher than the infinite position resistance Rinf corresponding to the infinite position of the imaging optical system 201. If this relationship is reversed, the imaging optical system 201 will pass by the infinite position Zinf and will go to the position wherein focusing is achieved at an finite distance, without the SMA drive current Is(n) being applied to the SMA 151 in the vicinity of the maximum value of the ambient temperature Ta. This explains the reason why the over-infinity area is provided in the first embodiment.

In FIG. 10b, the ambient temperature Table TaT is a tabulated version representing the relationship given in the form of a chart in FIG. 10a. This Table is a conversion table made up of the initial resistance Rs(0) of the SMA 151 and the ambient temperature Ta of the SMA 151 corresponding to Rs(0). In this example, the range from −20° C. through +60° C. which is the guaranteed operation temperature range of the image pickup apparatus 10 is assumed as the range of the Table, and the initial resistance Rs(0) within this range is divided at an equally spaced intervals (e.g., the range from 35Ω to 30Ω at an interval of 1Ω). The ambient temperature Ta corresponding to each initial resistance Rs(0) is organized in the form of a table. The interval of dividing the Table is determined with consideration given to the required detection accuracy of the ambient temperature Ta.

Alternatively, when the initial resistance Rs(0) not present in the ambient temperature Table TaT has been detected in Step S205 of FIG. 8, the ambient temperature Ta of the SMA 151 can be calculated in Step S207 of FIG. 8, for example, by proportional distribution from the initial resistance Rs(0), on the table, above and below the initial resistance Rs(0) which has been detected. Further, it is also possible to store the conversion formula for converting the initial resistance Rs(0) into the ambient temperature Ta, instead of the ambient temperature Table TaT.

Figure 11:
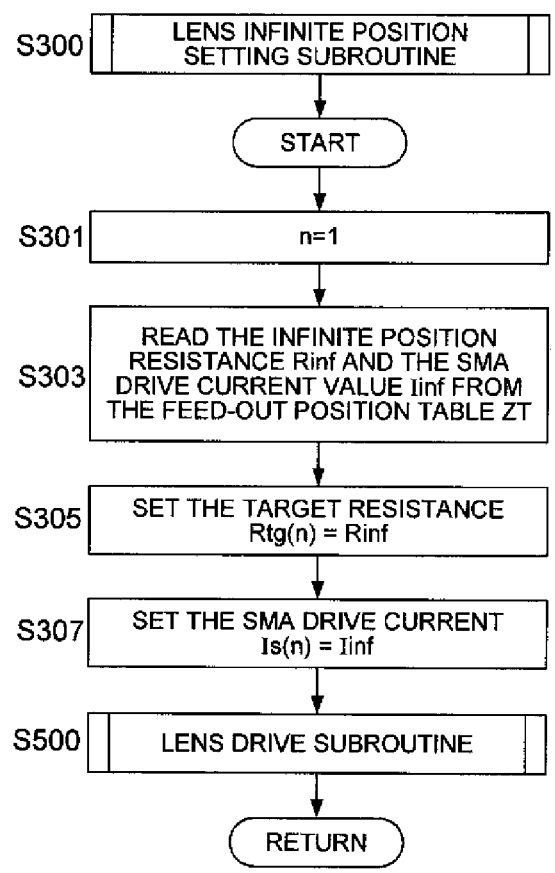
FIG. 11 is a flow chart showing the Step S300 "lens infinite position setting subroutine" of FIG. 7.

In FIG. 11, the AF step number n denoting the feed-out position of the imaging optical system 201 is set to "1" denoting the infinite position (infinite position parameter setting up process) in Step S301. In Step S303, the infinite position resistance Rinf of the SMA 151 corresponding to feed-out position Z(1)=Zinf at the time of the imaging optical system 201 being focused at infinity, and the approximate SMA drive current value Iinf for the resistance of the SMA 151 to be the infinite position resistance Rinf are read out from the feed-out position Table ZT of FIG. 5b (infinite position resistance read-in process).

In Step S305, the target resistance Rtg(n) used as a control target in the following control procedure is set to the infinite position resistance Rinf having been read in Steps S303 (infinite position target resistance setup process). In Step S307, the drive current Is(n) of the SMA 151 is set to the reference SMA drive current value Iinf having been read in Step S303 (infinite position drive current value setup process).

Then, the Step S500 "lens drive subroutine" is executed, and the drive current Is(n) applied to the SMA 151 is controlled in such a way that the resistance Rs(n) of the SMA 151 is becomes the infinite position resistance Rinf, whereby the imaging optical system 201 is moved to the infinite position Zinf (imaging optical system infinite position setting up step). Then, the system goes to Step S300 of FIG. 7. Step S500 "lens drive subroutine" will be described with reference to FIG. 12.

Figure 12:
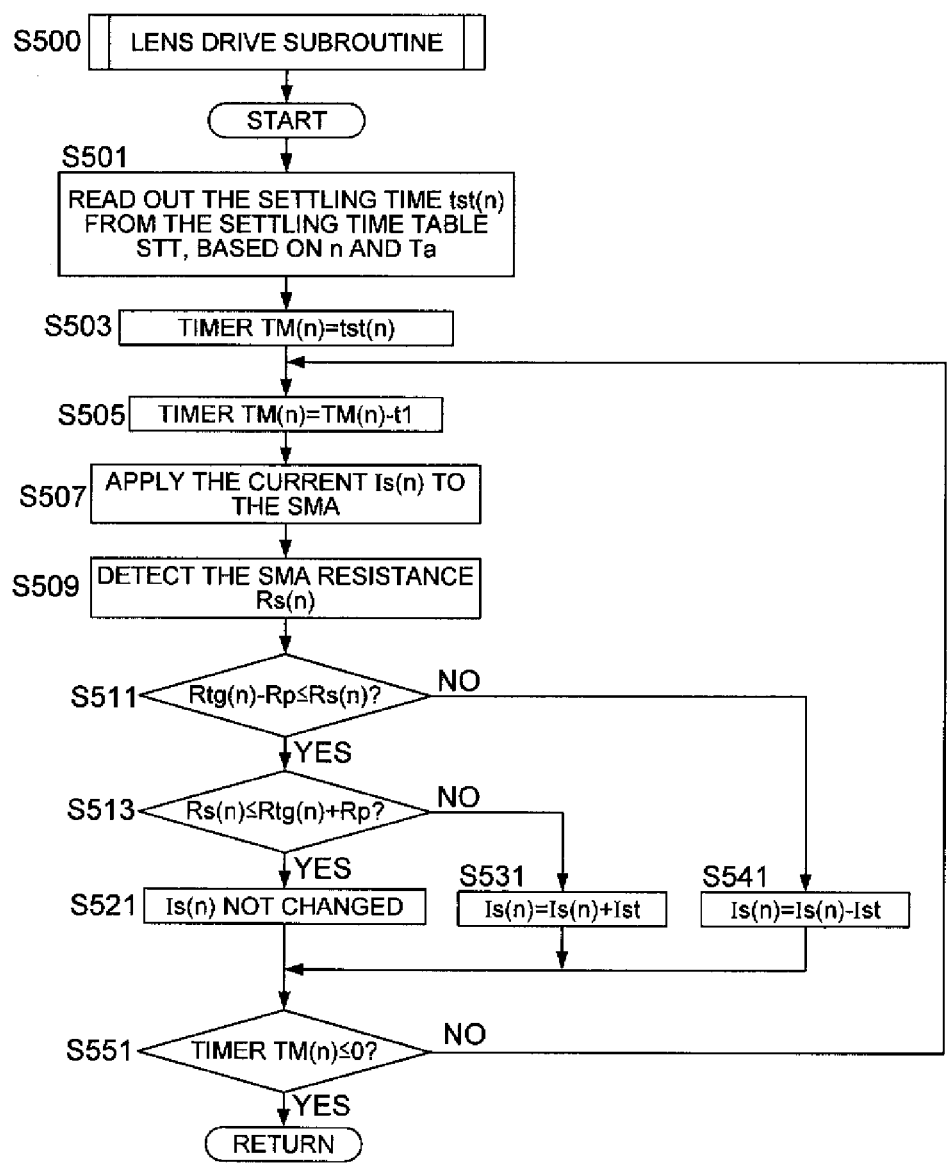
FIG. 12 is a flow chart showing the Steps S500 "lens drive subroutine" of FIGS. 11 and 15.

FIG. 12 is a flow chart showing Step S500 "lens drive subroutine" of FIGS. 11 and 15 (to be described later).

In FIG. 12, the settling time tst(n) is read out of the settling time Table STT (settling time reading process) based on the AF step number n denoting the feed-out position of the imaging optical system 201 and the ambient temperature Ta of the SMA 151 in Step S501. The ambient temperature Ta can be accurately detected when the initial resistance Rs(0) of the SMA 151 is detected by the Step S200 "status detection subroutine" of FIG. 7.

As described above, the settling time tst(n) indicates the time required for the feed-out position Z(n) of the imaging optical system 201 to be settled when the imaging optical system 201 has been moved from the AF step number n−1 to the AF step number n. The settling time tst(n) and settling time Table STT will be described later with reference to FIGS. 13a, 13b and FIG. 14.

The settling time tst(n) read out at Steps S501 on timer TM(n) is set at Step S503. A predetermined time t1 required to execute any one of the three processes from Steps S507 through S551 is subtracted from the timer TM(n) in Steps S505.

In Step S507, the SMA 151 generates heat (drive current application step) when drive current Is(n) is applied to the SMA 151. In Step S509, the resistance Rs(n) of the SMA 151 is detected by the circuit of the aforementioned FIG. 6 according to the Formula 1 (resistance detection step). In Step S511, verification is made to see whether or not the resistance Rs(n) of the SMA 151 detected in Step S509 is equal to or greater than the value (Rtg(n)−Rp) which is smaller than the target resistance Rtg(n) by the allowable error Rp.

If the resistance Rs(n) of the SMA 151 is equal to or greater than the value (Rtg(n)−Rp) (Step S511: Yes), verification is made in Step S513 to see whether or not the resistance Rs(n) of the SMA 151 is equal to or smaller than the value (Rtg(n)+Rp) which is greater than the target resistance Rtg(n) by the allowable error Rp. If the resistance Rs(n) is equal to or smaller, i.e., if the resistance Rs(n) of the SMA 151 is within the range of the target resistance Rtg(n)±allowable error Rp (Step S513: Yes), the resistance Rs(n) of the SMA 151 is regarded as having reached the target value, and the value of the drive current Is(n) of the SMA 151 is fixed in Step S521. Then the system goes to Step S551.

If the resistance Rs(n) of the SMA 151 is greater than the value (Rtg(n)+Rp) which is greater than the target resistance Rtg(n) by allowable error Rp (Step S513: No), the temperature of the SMA 151 is regarded as being excessively low in Step S513, and the temperature of the SMA 151 is raised in Step S531. Thus, the drive current Is(n) of the SMA 151 is set to a level which is greater than the present value by a predetermined value Ist, and the system goes to the Step S551.

If the resistance Rs(n) of the SMA 151 is smaller than the value (Rtg(n)−Rp) which is smaller than the target resistance Rtg(n) by the allowable error Rp (Step S511: No), the temperature of the SMA 151 is regarded as being excessively high, and the temperature of the SMA 151 is reduced in Step S541. Thus, the drive current Is(n) of the SMA 151 is set to a level which is smaller than the present value by the predetermined value Ist, and the system goes to the Step S551.

In Step S551, verification is made to see whether or not the timer TM80) is equal or less than 0, in other words, the settling time tst(n) has elapsed after the timer TM(n) was set in Steps S503. If the settling time tst(n) has elapsed (Step S551: Yes), the system returns to the upper level routine of FIG. 11 and FIG. 15.

If the settling time tst(n) has not elapsed (Step S551: No), the system goes back to Step S505, and the operations of Step S505 through Step S551 are repeated until the settling time tst(n) elapses.

Here, Steps S511 and S513 are a resistance evaluation step, and the Step S531 and S541 are a drive current feedback step.

Step S531 and S541 show method wherein the drive current Is(n) of the SMA 151 is increased or decreased in a step manner by the predetermined value Ist. It is also possible to make such an arrangement that, based on the result of comparison in the comparator section 335 of FIG. 6 between the present resistance Rs(n) of the SMA and the target resistance Rtg(n), a new value of the drive current Is(n) of the SMA 151 is calculated by the drive amount calculating section 337, and the drive current Is(n) of the SMA 151 is controlled based on the result of the calculation.

Figure 13A:
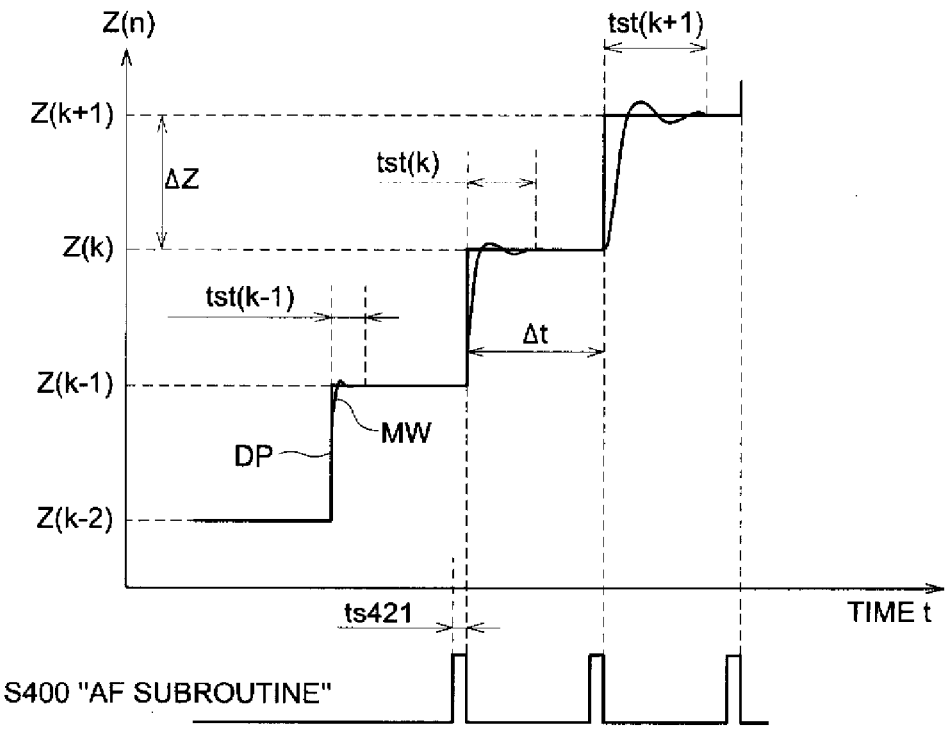
FIGS. 13a and 13b are schematic diagrams showing the settling time.
Figure 13B:
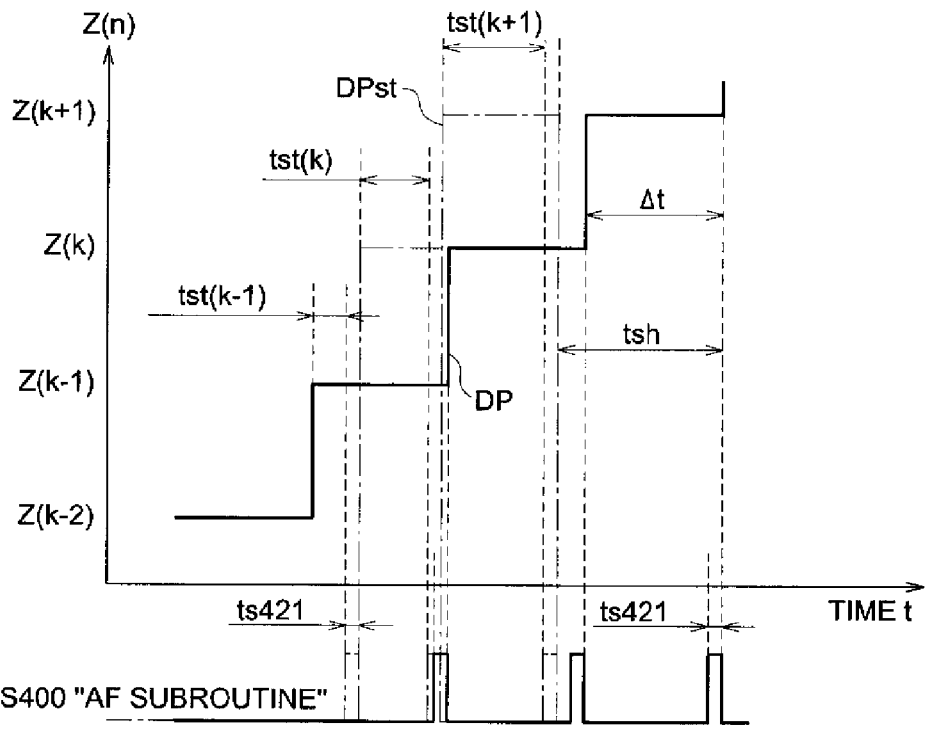

FIGS. 13a and 13b are schematic diagrams showing the aforementioned settling time tst(n). FIG. 13a, which is different from the method described with reference to FIG. 12, shows the drive waveform and moving waveform of the imaging optical system 201 when the imaging optical system 201 is fed out by the step drive at the same intervals. FIG. 13b shows the comparison between the time required for performing the step drive at a predetermined intervals, and the time required for performing the step drive while waiting for the lapse of the settling time as described in FIG. 12.

In FIG. 13a, when the drive waveform DP is applied to the imaging optical system 201, and the imaging optical system 201 is moved from the position Z(k−2) of AF step number n=k−2 to the position Z(k−1) of AF step number n=k−1, the imaging optical system 201 actually moves in the manner similar to the moving waveform MW due to mechanical response delay, bounding and other factors. Assume that the settling time tst(n) is from the stat or the drive to the timing when the response delay, bounding and other factors have converged, and the position of the imaging optical system 201 is settled. The settling time tst(n) changes according to the present position Z(n) of the imaging optical system 201, ambient temperature Ta and other factors. Thus, when the step drive is performed at a predetermined intervals Δt, with consideration given to various conditions, the predetermined interval Δt must be set at a level equal to or greater than the longest settling time plus the time ts421 required for executing Step S421 "AF data acquisition step" of FIG. 15. A lot of time is required to move the imaging optical system 201 to the focused position.

As compared to the case wherein the aforementioned step drive is performed at a predetermined intervals Δt (drive waveform DP denoted by solid line in the drawing) in FIG. 13b, Step S400 "AF subroutine" of FIG. 7 is executed after the lapse of the settling time tst(n) at each step in the step drive of the imaging optical system 201, as shown in FIG. 12. Then, the next step drive is performed (drive waveform DPst indicated by the one-dot chain line in hte4 drawing) immediately after 5400. This procedure makes it possible to reduce the time, for example, by time tsh for driving the imaging optical system 201 from the position Z(k−2) of the AF step number n=k−2 to the position Z(k+1) of the AF step number n=k+1.

FIG. 14 is a diagram showing an example of the stability time table STT. As described with reference to FIGS. 13a and 13b, the settling time tst(n) varies with the current position Z(n) of the imaging optical system 201, ambient temperature Ta and other factors. Thus, the settling time Table STT is made up of the AF step number n and the settling time tst(n) at that position for each ambient temperature Ta.

In this example, similarly to the case of FIGS. 10a and 10b, the range of the Table can be set to the range from −20° C. to +60° C. which is the guaranteed operation temperature range of the image pickup apparatus 10, for example. The ambient temperature Ta for this range is divided at an equally spaced intervals (e.g., in increment of 10° C.), and the AF step number n and the settling time tst(n) corresponding to the AF step number n are incorporated in the Table for each ambient temperature Ta. The width for dividing the ambient temperature Ta can be determined with consideration given to the accuracy required of the settling time tst(n).

If the ambient temperature Ta is not included in the settling time Table STT, the settling time tst(n) can be calculated by proportional distribution from the settling time Table STT. It is also possible to use the settling time Table STT of the closest ambient temperature Ta. The settling time Table STT is used with reference to FIG. 12.

Figure 15:
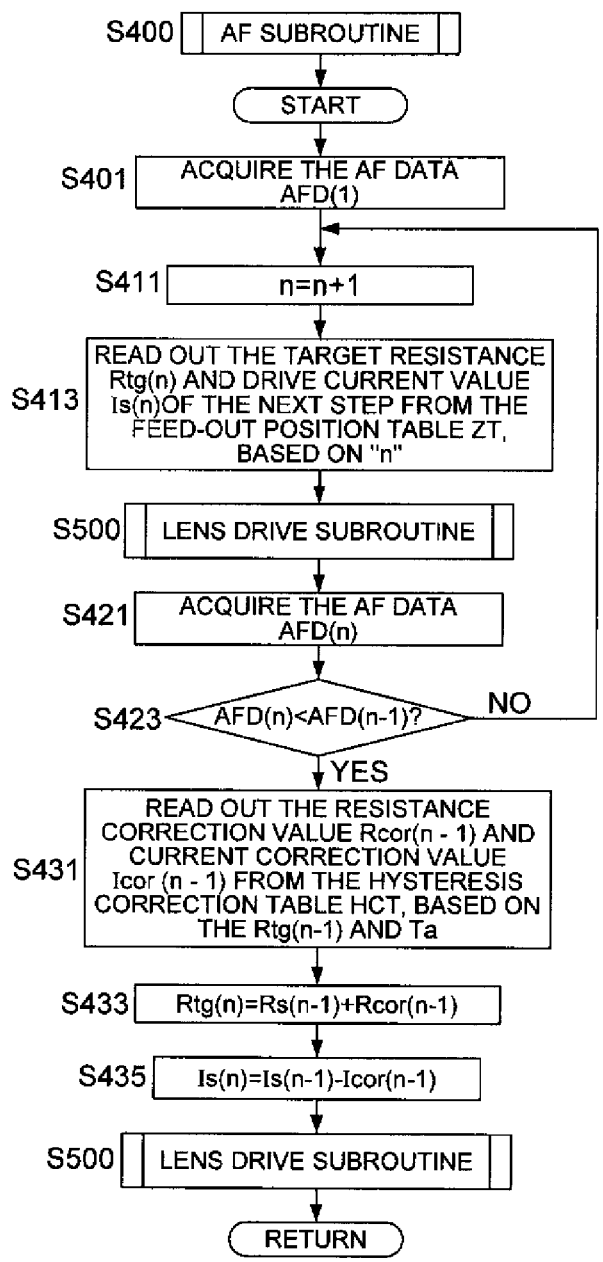
FIG. 15 is a flow chart showing the Steps S400 "AF subroutine" of FIG. 7.

FIG. 15 is a flow chart showing the Steps S400 "AF subroutine" of FIG. 7. The AF operation performed by this subroutine uses the so-called the mountain climbing control method, without requiring installation of a separate sensor designed specifically for AF operations. The mountain climbing control method refers to the technique of detecting the contrast of the image and finding out the position of the maximum contrast, i.e., the focused position, while moving the imaging optical system 201 in a step manner at equally spaced intervals from the infinity side to the closest side.

The focus information of FIG. 1—i.e., the AF data AFD(n) denoting the contrast of the image in this case—can be defined normally as the sum of the differences between the image data of the adjacent AF pixels within the AF area on the image pickup device 301. Needless to say, it is also possible to use other methods including the sum of the differences between the image data of all the pixels of the image pickup device 301.

In FIG. 15, the Step S300 "lens infinite position setting subroutine" of FIG. 11 is executed in Step S401, and the imaging optical system 201 is set to the infinite position (AF step number n=1). Under this condition, the AF data AFD(1) at the infinite position is acquired (infinity AF data acquisition step).

In Step S411, "1" is added to the AF step number n (parameter change step). In Step S413, the target resistance Rtg(n) corresponding to the AF step number n and the reference SMA drive current value Is(n) are read out from the feed-out position Table ZT described with reference to FIG. 5b, based on the AF step number n (target resistance read-out process). This is followed by execution of the Step S500 "lens drive subroutine" of FIG. 12, with the result that the imaging optical system 201 is fed out from the infinity side toward the closest side by one step (imaging optical system feed-out step).

In Step S413, the target resistance Rtg(n) and the approximate SMA drive current value Is(n) were assumed to be read out from the feed-out position Table ZT. However, it is also possible to make such arrangements that, in response to the difference between the current resistance Rs(n) of the SMA and target resistance Rtg(n) in the comparator section 335 of FIG. 6, the change value of the drive current Is(n) of the SMA 151 is calculated by the drive amount calculating section 337 in the Step S500 "lens drive subroutine", as described with reference to FIG. 12. Then, the drive current Is(n) of the SMA 151 is controlled based on the calculated change value of the drive current Is(n).

In this case, the approximate SMA drive current value Is(n) needs not to be read out. The feed-out position Table ZT can be made up of the AF step number n, and the target resistance Rtg(n) of the SMA 151 when the corresponding imaging optical system 201 is moved to each feed-out position Z(n).

In Step S421, the AF data AFD(n) denoting the image contrast is acquired (AF data acquisition step). In Step S423, verification is made to see whether or not the AF data AFD(n) acquired in Step S421 is smaller than the AF data AFD(n−1) acquired with the imaging optical system 201 positioned at the one-step previous position (AF data comparison process).

When the AF data AFD(n) is equal or greater than the AF data AFD(n−1) (Step S423: No), the system goes back to the Step S411, and "1" is added to the AF step number n. After that, the imaging optical system 201 is fed out in a step manner, repeatedly acquiring the AF data AFD(n) and comparing it with the AF data AFD(n−1), from the infinity side toward the closest side as if it were climbing a mountain, until the AF data AFD(n) is smaller than the AF data AFD(n−1), namely, until the imaging optical system 201 passes by the focused position of the imaging optical system 201 wherein the image contrast is maximized.

When the AF data AFD(n) is smaller than the AF data AFD(n−1) (Step S423: Yes), the imaging optical system 201 is regarded as having passed by the focused position. At and after Step S431, operations are performed to get the imaging optical system 201 back to the focused position.

It is the common practice in the conventional AF operation that, in the case where the imaging optical system 201 has passed by the focused position, the imaging optical system 201 is once fed back to the side of the initial position Z(0) from the focused position in order to correct the backlash caused by the gear and cam, before the imaging optical system 201 is moved to the feed-out position Z(n−1) which is supposed to be the focused position. Moving the imaging optical system 201 in this method takes much time, since the imaging optical system 201 is fed out after having been fed in.

In the first embodiment, however, the imaging optical system 201 is moved from the feed-out position Z(n) of the imaging optical system 201 to the feed-out position Z(n−1) as the focused position in one operation. This arrangement realizes a substantial reduction in the time of moving the imaging optical system 201.

However, similarly to the case of the backlash in the conventional drive mechanism using the gear and cam, the AF mechanism 100 described with reference to FIGS. 2a, 2b and 2c and FIGS. 4a, 4b and 4c contains hysteresis in the relationship between the target resistance Rtg(n) of the SMA 151 and the feed-out position of the imaging optical system 201 Z(n) in the case wherein the imaging optical system 201 is fed out from the infinity side toward the closest side, as compared to the case wherein the imaging optical system 201 is fed in from the closest side toward the infinity side. The hysteresis will be described later with reference to FIG. 16.

Thus, even if control is provided in the Step S500 "lens drive subroutine" of FIG. 12 so that the resistance Rs(n) of the SMA 151 is equal to the one-step previous target resistance Rtg(n−1) of the SMA 151, the imaging optical system 201 cannot be fed back to the focused position.

In Step S431, the resistance correction value Rcor(n−1) and current correction value Icor(n−1) are read out from the hysteresis correction table HCT (to be described later with reference to FIG. 17) (hysteresis correction value read-out step), based on the one-step previous target resistance Rtg(n−1) of the SMA 151, and the ambient temperature Ta of the SMA 151. The initial resistance Rs(0) of the SMA 151 is detected in Step S200 "status detection subroutine" of FIG. 7, whereby the ambient temperature Ta is detected at a high precision. In this case, the resistance correction value Rcor(n−1) is the hysteresis correction value in the present invention.

In Step S433, the target resistance Rtg(n) of the SMA 151 is set to Rs(n−1)+Rcor(n−1) (target resistance correction process). In Step S435, the drive current Is(n) of the SMA 151 is set to =Is(n−1)−Icor(n−1) (drive current correction process). This is followed by the execution of Step S500 "lens drive subroutine" of FIG. 12. With consideration given to the hysteresis, the imaging optical system 201 is fed back to the focused position in one operation (imaging optical system feed-in process), and the system returns to the upper level routine of FIG. 7.

In this case, resistance correction value Rcor(n−1) and current correction value Icor(n−1) are read out from the hysteresis correction table HCT in Step S431. In Step S433, the target resistance Rtg(n) of the SMA 151 is corrected to be Rs(n−1)+Rcor(n−1). In Step S435, the drive current Is(n) of the SMA 151 is corrected to be Is(n−1)−ICor(n−1).

As described with reference to FIG. 12, however, in Step S500 "lens drive subroutine", the change value of the drive current Is(n) of the SMA 151 can be calculated in the drive amount calculating section 337 in response to the difference between the current resistance Rs(n) of the SMA and the target resistance Rtg(n) in the comparator section 335 of FIG. 6, and the drive current Is(n) of the SMA 151 can be controlled, based on the change value of the drive current Is(n) having been calculated.

In this case, only the resistance correction value Rcor(n−1) is needed. There is no need of reading out the current correction value Icor(n−1). The hysteresis correction table HCT (to be described later) can be made up of the AF step number n at various ambient temperatures Ta corrected resistance Rcor(n−1) corresponding to the temperature Ta. Further, there is no need of using the Step S435.

Figure 16:
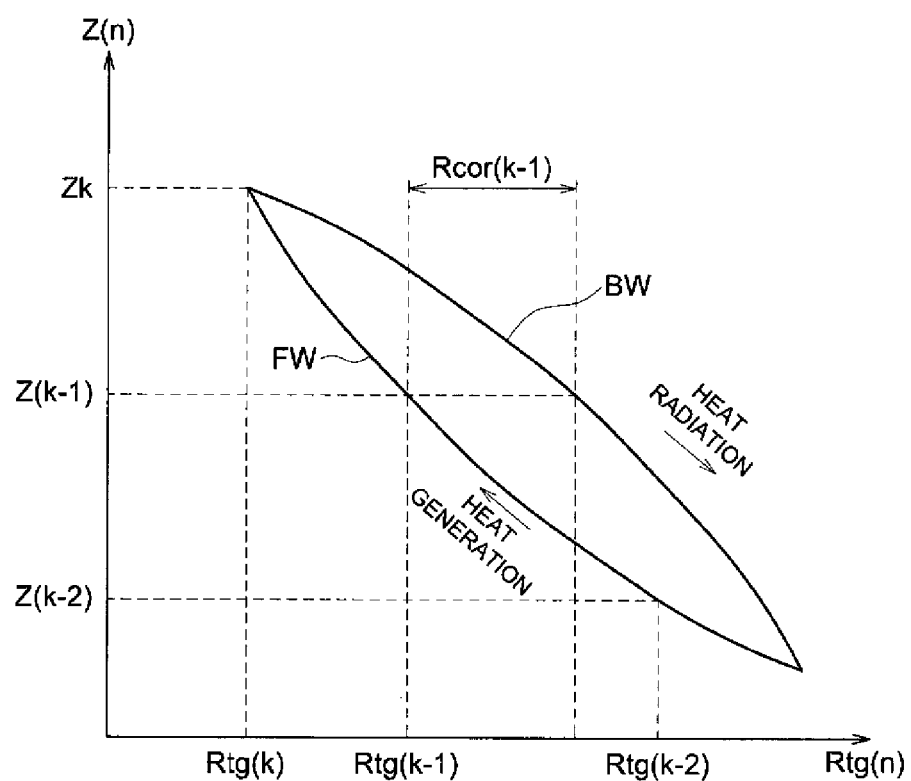

FIG. 16 is a schematic chart showing the hysteresis between the target resistance Rtg(n) of the SMA 151 and the feed-out position Z(n) of the imaging optical system 201 when the imaging optical system 201 is fed out and fed in. It shows the relationship between the target resistance Rtg(n) of the SMA 151 as the control target in the AF operation, and the position Z(n) of the imaging optical system 201.

In FIG. 16, in the first embodiment, the drive current Is(n) is applied to the SMA 151 and the SMA 151 contracts by generating heat, whereby the imaging optical system 201 is fed out from the infinity side toward the closest side. The relationship between the target resistance Rtg(n) of the SMA 151 and the feed-out position Z(n) of the imaging optical system 201 at the time of feed-out describes the locus FW as shown in the drawing. Here the imaging optical system 201 is moved from the position Z(k−1) of the AF step number n=k−1 to the position Z(k) of the AF step number n=k. When the AF data AFD(k) is regarded as being smaller than the AF data AFD(k−1) in Step S423 of FIG. 15, the imaging optical system 201 must be fed from the position Z(k) into the position Z(k−1) which is the focused position.

In this case, the relationship between the target resistance Rtg(n) of the SMA 151 at the time of feed-in operation of the imaging optical system 201 and the position Z(n) of the imaging optical system 201 describes a path BW different from that at the time of feed-out, because of the hysteresis mainly caused by the mechanical factors such as distortion of the drive arm 121 shown in FIGS. 2a, 2b and 2c.

Thus, to feed the imaging optical system 201 from the position Z(k) into the position Z(k−1), the target resistance Rtg(n) of the SMA 151 must be set to a value greater by the resistance correction value Rcor(k−1) than the target resistance Rtg(k−1) at the time of feed-out operation of the position Z(k−1). Accordingly, the SMA drive current value Is(n) at that time must be set to a value smaller by the current correction value Icor(k−1) than the SMA drive current value Is(k−1) at the time of feed-out operation. Further, the aforementioned hysteresis depends on the coefficient of linear expansion of the components constituting the AF mechanism 100, hence on the ambient temperature Ta as well.

FIG. 17 is a schematic diagram representing an example of the hysteresis correction table HCT.

In FIG. 17, the hysteresis correction table HCT is a correction table for correcting the hysteresis when the imaging optical system 201 is fed out and fed in, as described with reference to FIG. 16. It is made up of the AF step number n at various ambient temperatures Ta, the resistance correction value Rcor(n) and current correction value Icor(n). The hysteresis correction table HCT is stored in the storage section 340 of FIG. 1, for example.

In this example, similarly to the case of FIGS. 10a, 10b and FIG. 14, the range from −20° C. through +60° C. which is the guaranteed operation temperature range of the image pickup apparatus 10 is assumed as the range of the Table, for example. The ambient temperature Ta within this range is divided at equally spaced intervals (e.g., in increments of 10° C.). The AF step number n, the resistance correction value Rcor(n) and current correction value Icor(n), which are corresponding to the AF step number, are organized in the form of a table for each ambient temperature Ta. The interval of dividing the ambient temperature Ta can be determined with consideration given to the allowable error of hysteresis. The hysteresis correction table HCT is used with reference to FIG. 15.

As described above, in response to the difference between the current resistance Rs(n) of the SMA and the target resistance Rtg(n) in the comparator section 335 of FIG. 6, the change value of the drive current Is(n) is calculated by the drive amount calculating section 337, and the drive current Is(n) of the SMA 151 is controlled based on the change value of the calculated drive current Is(n). In this case, the hysteresis correction table HOT does not required the current correction value Icor(n).

In the first embodiment described above, a predetermined initial current Is(0) is applied to the SMA 151, and the initial resistance Rs(0) of the SMA 151 is detected, whereby the status of the SMA 151 including wire breakage, short circuit and leakage can be detected. This arrangement eliminates the possibility of an abnormal operation of the image pickup apparatus 10. Further, depending on the status, even if the SMA 151 is faulty, imaging operation can be performed, for example, by forcibly setting the imaging optical system to the pan-focus position.

A predetermined initial current Is(0) is applied to the SMA 151 to detect the initial resistance Rs(0) of the SMA 151, whereby the ambient temperature Ta of the SMA 151 can be detected, without having to install an additional temperature sensor such as a thermistor or a temperature detecting circuit for detecting the temperature using the temperature sensor. Thus, the ambient temperature Ta can be used to correct the temperature characteristics in the AF operation of the image pickup apparatus 10 to be described later. This arrangement enhances the image quality of the image pickup apparatus 10, and ensures cost reduction and space saving.

According to the first embodiment described above, when the image data is displayed in the preview mode, accurate movement of the imaging optical system 201 to the infinite position Zinf can be ensured by controlling the drive current Is(n) to be applied to the SMA 151 in such a way that the resistance Rs(n) of the SMA 151 is equal to the infinite position resistance Rinf. This arrangement enhances the image quality of the image pickup apparatus 10, and ensures cost reduction and space saving without the need of installing an additional sensor for detecting the feed-out position of the imaging optical system 201, or a detecting circuit.

Further, by moving the imaging optical system 201 to the infinite position Zinf, a moving image can be displayed at the time of previewing with the imaging optical system focused at infinity. This feature provides the user with the image pickup apparatus 10 of enhanced usability for easy determination of framing for imaging. Further, the drive current Is(n) is applied to the SMA 151 and therefore, the SMA 151 is preheated. This procedure enhances the response in the drive of the imaging optical system 201 in the Step S400 "AF subroutine" to be executed thereafter. The user is provided with the image pickup apparatus 10 of enhanced usability.

Moreover, according to the first embodiment, in the case of step drive of the imaging optical system 201, the settling time tst(n) from the input of the drive waveform to the completion of the movement of the imaging optical system 201 and stabilization at that position is prepared in advance in the form of a settling time Table STT. The "AF data acquisition step" is executed immediately after the lapse of the settling time tst(n) at each position of the step drive of the imaging optical system 201. This is followed by execution of the immediately next step drive. This arrangement reduces the time of moving the imaging optical system 201 to the focused position, as compared with the conventional method of performing the step drive at each predetermined intervals Δt. Thus, the user is provided with the image pickup apparatus 10 of enhanced usability.

According to the first embodiment described above, to correct the hysteresis when the imaging optical system 201 is fed out and fed in, the resistance correction value Rcor(n) and, if required, the current correction value Icor(n) are prepared in advance in the form of the hysteresis correction table HCT for each ambient temperature Ta. The accurate information on the ambient temperature Ta is provided by detecting the initial resistance Rs(0) of the SMA 151 in Step S200 "status detection subroutine" of FIG. 7.

When the imaging optical system 201 is moved back to the focused position from the position beyond the focused position, the target resistance Rtg(n) of the SMA 151 and, if required, the SMA drive current value Is(n) are corrected using the resistance correction value Rcor(n) and current correction value Icor(n) of the hysteresis correction table HCT. This arrangement allows the imaging optical system 201 to be moved back to the focused position from the position beyond the focused position in one operation. There is no need of moving the imaging optical system 201 back to the initial position Z(0) once, as in the conventional method. Since this arrangement reduces the time of moving the imaging optical system 201 to the focused position, the user is provided with the image pickup apparatus 10 of enhanced usability.

Figure 18A:
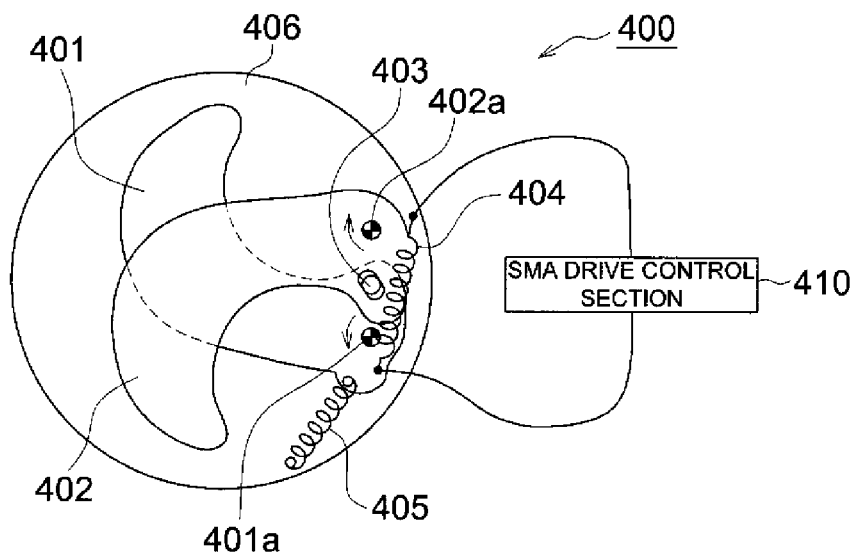
FIGS. 18a and 18b are schematic diagrams representing the shutter unit as a second embodiment of the present invention.
Figure 18B:
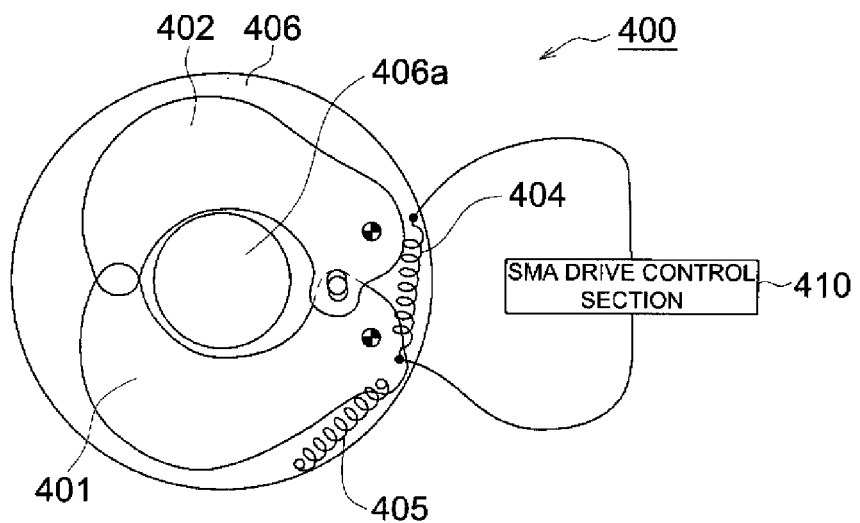

The following describes a second embodiment of the present invention with reference to FIGS. 18a, 18b and FIG. 19. FIGS. 18a and 18b are schematic diagrams representing the shutter unit as the second embodiment of the present invention. FIG. 18a shows the case wherein the shutter is closed, while FIG. 18b shows the case wherein the shutter is fully open. In this embodiment, the shutter unit is equipped with a coil spring-shaped SMA as a drive source of the shutter blades.

In FIGS. 18a and 18b, the shutter unit 400 is made up of shutter blades 401 and 402, rotary shafts 401a and 402a, connecting pin 403, SMA 404, bias spring 405, shutter base plate 406 and SMA drive control section 410. The shutter base plate 406 is equipped with a shutter aperture 406a.

The SMA drive control section 410 serves as a drive section, shape memory alloy resistance calculating section, temperature detection section, storage section and temperature correction section in the present invention. Further, the shutter unit 400 corresponds to the drive module of the present invention, the rotary shafts 401a and 402a, connecting pins 403, SMA 404, shutter base plate 406 and SMA drive control section 410 correspond to the drive unit of the present invention. The shutter blades 401 and 402 correspond to the driven member of the present invention.

In FIG. 18a, the shutter blades 401 and 402 are rotatably supported about the rotary shafts 401a and 402a, respectively, and are connected with each other by a connecting pin 403. Between the shutter blade 401 and shutter base plate 406, the SMA 404 and bias spring 405 are connected in such a way that the forces thereof are applied in the opposite directions each other. The SMA 404 and bias spring 405 work as an actuator for driving the shutter blade 402.

When electric current is applied to the SMA 404 by the SMA drive control section 410, the SMA 404 contracts, the shutter blade 401 rotates about the rotary shaft 401a in the counterclockwise direction of the drawing against the biasing force of the bias spring 405. In synchronism therewith, the shutter blade 402 connected by the connecting pin 403 also rotates about the rotary shaft 402a in the clockwise direction of the drawing. This procedure opens the shutter. Thus, the shutter has been fully opened to be in the status of FIG. 18b.

When the electric current to the SMA 404 is turned off and the contraction of the SMA has been suspended, the shutter blade 401 is rotated about the rotary shaft 401a by the biasing force of the bias spring 405 in the clockwise direction of the drawing. In synchronism therewith, the shutter blade 402 connected by the connecting pin 403 also rotates about the rotary shaft 402a in the counterclockwise direction. This procedure allows the shutter to be closed and to be in the status of FIG. 18a. The aforementioned operation is controlled by the SMA drive control section 410.

FIG. 19 is a flow chart showing an example of the flow of the operations when the shutter unit 400 of the second embodiment is used in a digital camera.

In FIG. 19, when the power of the digital camera has been turned on, the ambient temperature Ta is measured according to the method of calculating the initial resistance Rs(0) of the SMA in Step S703, similarly to the case of the Step S200 "status detection subroutine" of FIG. 8 in the first embodiment (status detection step). The ambient temperature Ta having been measured is used to correct the temperature dependency of hysteresis when the subsequent operations of the shutter unit 400 are performed, for example, when the shutter blades 401 and 402 are moved to the reference position immediately before opening in the Step S715 to be described later. This enhances the performance of the shutter.

This is followed by Step S705 wherein electric current is applied to the SMA 404, and the shutter blades 401 and 402 are fully opened. Then the preview operation starts in Step S707 (preview step). In the case of the digital camera, the AF operation is generally performed in the preview mode, differently from the case of the mobile phone in the first embodiment. When the shutter button is pressed halfway down by the user in Step S709, and the AF switch is turned on, the AF operation and photometric (AE) operation are performed in Step S711, and the position of the image taking lens and exposure value are locked (AF/AE locking step).

In Step S713, verification is made to see whether or not the release switch has been turned on with the shutter button fully pressed by the user (release detection step). The system waits in Step S713 until the release switch is turned on. When the release switch has been turned on (Step S713:Yes), the shutter is closed once in Step S715. In this case, however, the shutter blades 401 and 402 are moved to a pre-opening reference position where the shutter blades 401 and 402 have to be immediately before opening (shutter blade reference position setup step), instead of the shutter blades 401 and 402 being fed back to the initial position by turning off of the electric current applied to the SMA 404.

Similarly to the case of the "lens infinite position set subroutine" of FIG. 11 in the first embodiment, the shutter blades 401 and 402 is driven to the pre-opening reference position by controlling the SMA drive current Is(n) so that the resistance Rs(1) of the SMA is equal to the target resistance Rtg(1) corresponding to the pre-opening reference position. Further, similarly to the case of the "AF subroutine" of FIG. 15 in the first embodiment, the target resistance Rtg(1) of the pre-opening reference position is determined by taking into account the hysteresis between the operations of opening and closing the shutter blades 401 and 402.

In Step S717, the shutter is opened again up to the aperture value obtained from the exposure value determined in Steps S711. In Step S719, imaging operation is performed during the time of exposure obtained from the exposure value determined in Steps S711. The application of electric current to the SMA 404 is turned off in Step S721, and the shutter blades 401 and 402 are moved back to the initial position. In this case, Steps S717, S719 and S721 are an imaging step.

In Step S723, verification is made to see whether or not imaging operation is terminated (imaging termination check step). If the imaging operation is not terminated (Step S723: No), the system goes to Step S703, and the ambient temperature Ta is measured again. After that, the aforementioned operation is repeated.

If the imaging operation is terminated (Step S723:Yes), the power of the digital camera is turned off in Step S725, and a series of operations terminates.

As described above, according to the second embodiment, a predetermined initial current Is(0) is applied to the SMA 404 and the initial resistance Rs(0) of the SMA 404 is detected, whereby the ambient temperature Ta of the SMA 404 can be detected, without having to install an additional temperature sensor such as a thermistor, or a temperature detecting circuit for detecting the temperature using the temperature sensor. This arrangement enhances the performances of the shutter unit 400, and ensures cost reduction and space saving.

Further, when the shutter is once closed in response to the user's making the release switch on, the drive current Is(n) of the SMA 404 is controlled in such a way that the resistance Rs(1) of the SMA 404 is equal to the target resistance Rtg(1) of the pre-opening reference position. This control ensures accurate closing of the shutter blades 401 and 402 up to the pre-opening reference position without installing an additional sensor or detecting circuit for detecting the positions of the shutter blades 401 and 402. This arrangement decreases the release time lag of re-opening of the shutter in Step S717, and hence enhances the performances of the shutter unit 400, and ensures cost reduction and space saving.

Further, drive current Is(n) applied to the SMA 404 preheats the SMA 404. This enhances the response when re-opening the shutter in the following Step S717, and provides shutter unit 400 of excellent usability.

In addition, the resistance correction value Rcor(n) is used to correct the hysteresis of the target resistance Rtg(1) corresponding to the pre-open reference position when the shutter is opened and closed, whereby the shutter blades 401 and 402 are moved from the fully opened position back to the pre-opening reference position in one operation. This arrangement decreases a release time lag and provides shutter unit 400 of excellent usability.

Figure 20A:
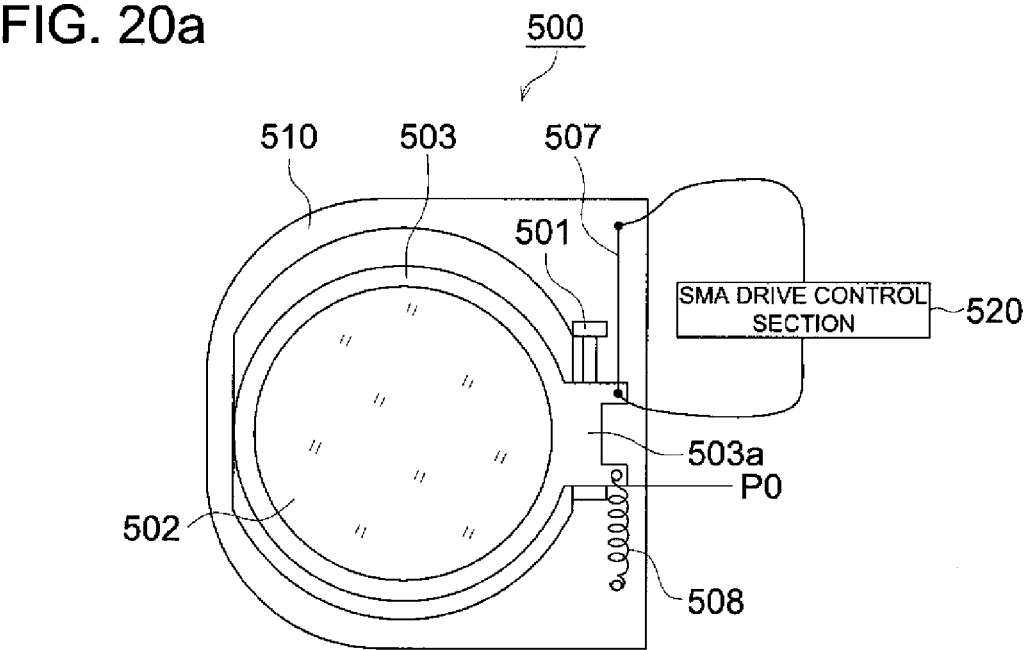
FIGS. 20a and 20b are schematic diagrams representing an image stabilization function as a third embodiment of the present invention.
Figure 20B:
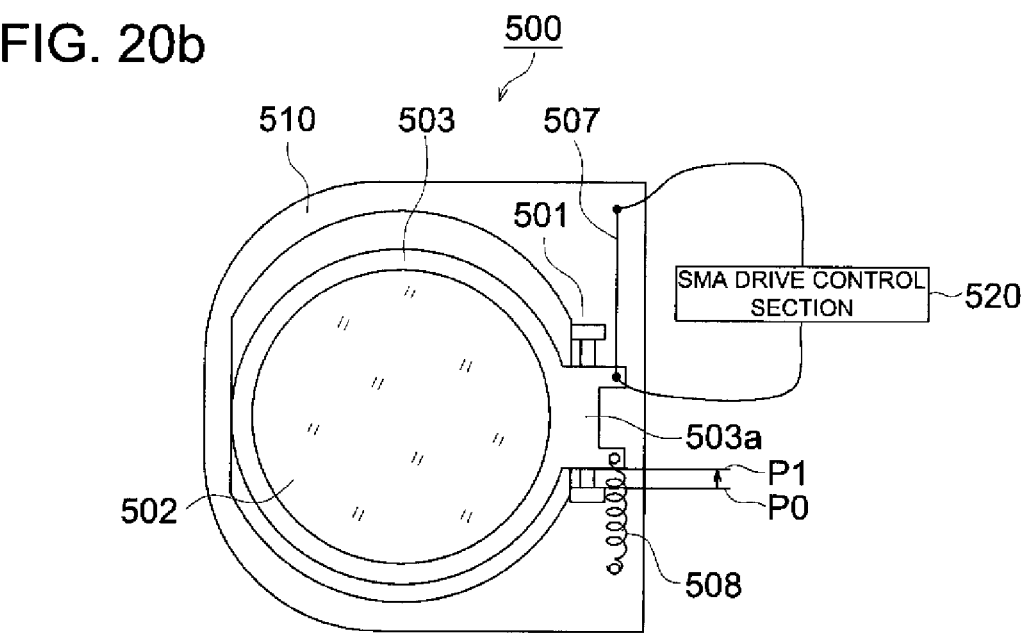
Figure 21:
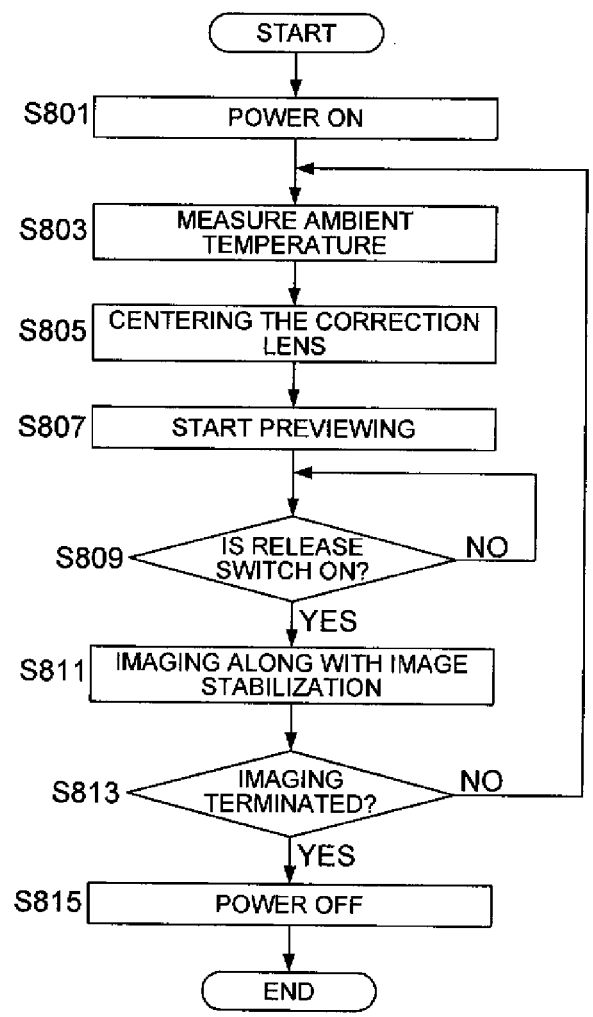
FIG. 21 is a flow chart representing an example of the flow of the operation when the image stabilizing unit is used in the image pickup apparatus.

Referring to FIGS. 20a and 20b, and FIG. 21, the following describes a third embodiment of the present invention: FIGS. 20a and 20b are schematic diagrams representing an image stabilization function as a third embodiment of the present invention. FIG. 20a shows the case wherein the image stabilization function is not utilized, while FIG. 20b shows the case wherein the image stabilization function is being utilized. In the third embodiment, an example is given to illustrate the method of image stabilization, wherein a wireshaped SMA is provided as a drive source, and a compensation lens incorporated in the imaging optical system is moved to stabilize the image. However, the same effects can also be provided by the method of moving an image pickup element.

In FIGS. 20a and 20b, the image stabilizing unit 500 is comprised of a base 510, guide rod 501, compensation lens 502, holding frame 503, SMA 507, bias spring 508 and SMA drive control section 520. In this case, the SMA drive control section 520 serves as a drive section, shape memory alloy resistance calculating section, temperature detection section, storage section and temperature correction section in the present invention. The image stabilizing unit 500 corresponds to the drive module of the present invention. The base 510, guide rod 501, holding frame 503, SMA 507 and SMA drive control section 520 corresponds to the drive unit in the present invention. The compensation lens 502 corresponds to the driven member in the present invention.

FIG. 20a shows that application of electric current to the SMA 507 is suspended. In FIG. 20a, the sliding section 503a of the holding frame 503 holding the compensation lens 502 is engaged slidably with the guide rod 501 mounted on the base 510. Between the sliding section 503a and base 510, the SMA 507 and bias spring 508 are connected in such a way that the forces thereof is applied in the opposite directions. Since application of power to the SMA 507 is suspended, the holding frame 503, namely, compensation lens 502 is pulled downwardly in the drawing by the biasing force of the bias spring 508, and is stopped at the SMA power-off position P0 (zero) which is the initial position.

FIG. 20b shows that the standby current Is(1) is applied to the SMA 507, and the compensation lens 502 is moved to the centering position of the optical axis of the imaging optical system. In FIG. 20b, the standby current Is(1) has been applied to the SMA 507 to contract the SMA 507 in such a way that the resistance Rs(1) of the SMA 507 is equal to the target resistance Rtg(1) of the centering position which is the reference position. Then the holding frame 503, namely, the compensation lens 502 has been moved upwardly in the drawing along the guide rod 501 against the biasing force of the bias spring 508, and has been stopped at the centering position P1.

The position of the compensation lens 502 can be moved to a desired position from the centering position P1 for image stabilization by controlling the drive current Is(n) while monitoring the resistance Rs(n) of the SMA 507. This requires correction of the hysteresis between the movement from top to bottom and from bottom to top in the drawing. Further, the time needed for movement differs depending on the vertical position of the compensation lens 502. Thus, similarly to the case of FIG. 12 in the first embodiment, the settling time for minimizing the time of movement must be set.

For ease of explanation, an example of the image stabilizing unit 500 only for the vertical one-axis direction is shown in the drawing. However, an image stabilizing unit for two axis directions can be implemented by stacking the same mechanism as that in the present example on the image stabilizing unit 500 in such a way that the moving directions are perpendicular to each other.

FIG. 21 is a flow chart representing an example of the flow of the operation when the image stabilizing unit 500 as the third embodiment is used in the image pickup apparatus such as a digital camera or mobile phone camera. It should be noted that FIG. 21 shows only the flow of the operation related to image stabilization. The flow related to the AF or exposure control is not shown in this drawing.

In FIG. 21, when the power of the imaging apparatus is turned on in Steps S801, the ambient temperature Ta is measured according to the method of calculating the initial resistance Rs(0) of the SMA in Step S803 (status detection step), similarly to the Step S200 "status detection subroutine" of FIG. 8 in the first embodiment and the Step S703 of FIG. 19 in the second embodiment. The measured ambient temperature Ta is used to correct the subsequent operations of the image stabilizing unit 500, for example, to correct the hysteresis when the compensation lens 502 is moved to the image stabilization position in the Steps S811 (to be described later), and to correct the temperature dependency of the time for movement. This arrangement enhances the performance of the image stabilizing unit 500.

This is followed by the Step S805 wherein the standby current Is(1) is applied to the SMA 507 in such a way that the reference position resistance Rs(1) of the SMA 507 is equal to the target resistance Rtg(1) of the centering position which is the reference position, whereby the compensation lens 502 is moved from the SMA power-off position P0 (zero) to the centering position P1 (compensation lens centering step). The preview operation starts in Step S807 (preview step). In Step S809, verification is made to see whether or not the release switch is fully pressed to be turned on (release detection step). The system waits in Step S809 until the release switch is turned on.

When the release switch has been turned on (Step S809: Yes), the drive current Is(n) of the SMA 507 is controlled in Step S811 in such a way that the resistance Rs(n) of the SMA 507 is equal to the target resistance Rtg(n) of the SMA 507 corresponding to the moving distance of the compensation lens 502 calculated by the image stabilizing amount calculating section (not illustrated). Thus, image stabilization operation and imaging operation are performed at the same time, whereby the image data is generated (image stabilizing and imaging step).

In Step S813, verification is made to see whether or not the imaging operation is terminated (imaging termination check step). If the imaging operation is not terminated (Step S813: No), the system goes back to Step S803 wherein the ambient temperature Ta is measured. After that, the aforementioned operation is repeated. If the imaging operation is terminated (Step S813: Yes), the imaging apparatus is turned off in Steps S815 and a series of operations terminates.

As described above, according to the third embodiment, a predetermined initial current Is(0) is applied to the SMA 507 and the initial resistance Rs(0) of the SMA 507 is detected, whereby the ambient temperature Ta of the SMA 507 can be detected, without having to install an additional temperature sensor such as a thermistor or a temperature detecting circuit for detecting the temperature using the temperature sensor. This arrangement enhances the performances of the image stabilizing unit 500, and ensures cost reduction and space saving.

Application of the standby current Is(1) is controlled in such a way that the reference position resistance Rs(1) of the SMA 507 is equal to the target resistance Rtg(1) of the centering position, and the compensation lens 502 is moved from the SMA power-off position P0 (zero) to the centering position P1. This procedure allows the compensation lens 502 to be moved to the centering position P1, without having to additionally install a sensor or a detecting circuit for detecting the position of the compensation lens 502. This enhances the performances of the image stabilizing unit 500, and ensures cost reduction and space saving.

Further, the resistance correction value Rcor(n) is used to correct the hysteresis of the target resistance Rtg(n) of the SMA 507 between the movements of the compensation lens 502 from bottom to top and from top to bottom for image stabilization. This procedure ensures quick movement of the compensation lens 502 to the intended position. Thus, this arrangement provides an image stabilizing unit 500 of excellent response.

In addition, when moving the compensation lens 502 for the purpose of image stabilization, the time needed for movement differs according to the position of the compensation lens 502. Thus, similarly to the case of FIG. 12 in the first embodiment, the settling time is set up to minimize the time needed for movement, and the compensation lens 502 is moved by waiting for the minimized settling time. This procedure ensures quick movement of the compensation lens 502 to the intended position. Thus, this arrangement provides an image stabilizing unit 500 of excellent response.

As described above, according to the present embodiment, provided are a drive unit and drive module which include a shape memory alloy as a drive source to move a driven member and are capable of the high-precision movement of the driven member to a reference position by controlling the shape memory alloy so that the resistance of the shape memory alloy is equal to the resistance when the driven member is located at the reference position. Further, as described in the above embodiment, the reference position can be paraphrased as the position where the driven member is on standby until it performs its own function.

It is to be expressly understood, however, that the details structure and detailed operations of the components constituting the drive unit and drive module of the present invention can be embodied in a great number of variations with appropriate modification or additions, without departing from the technological spirit and scope of the invention claimed.

What is claimed is:

1. A drive unit, comprising:
a shape memory alloy configured to move, by being supplied with electric current, a driven member in a first direction and in a second direction opposite to the first direction;
a drive section configured to supply electric current to the shape memory alloy;
a shape memory alloy resistance calculation section configured to calculate a resistance of the shape memory alloy when the shape memory alloy is supplied with electric current by the drive section, the resistance being used to measure a position of the driven member;
a control section configured to control the supply of the electric current to the shape memory alloy;
a comparison section configured to compare the resistance from the shape memory alloy resistance calculation section with a target resistance corresponding to a target position from the control section;
a drive amount calculation section configured to calculate a drive amount of the shape memory alloy on the basis of a comparison result of the comparison section and to output the drive amount to the drive section; and
a storing section configured to previously store hysteresis correction values based on resistance to be used to correct hysteresis between a case of moving the driven member in the first direction and a case of moving the driven member in the second direction,
wherein the hysteresis correction value is a difference between a resistance of the shape memory alloy corresponding to a target position in a case of moving the driven member in the second direction and a resistance of the shape memory alloy corresponding to the target position in a case of moving the driven member in the first direction,
wherein when the driven member, which has been moved in the first direction or the second direction and has reached a position beyond the target position, is to be moved in a reverse direction to the target position, the drive amount calculation section outputs the drive amount on the basis of a comparison result from the comparison section in which a comparison has been made by using the hysteresis values.

2. The drive unit of claim 1, wherein the control section corrects the target resistance on the basis of the hysteresis correction values and outputs the corrected target resistance to the comparison section.

3. The drive unit of claim 1, wherein the storing section stores the hysteresis correction values, for different ambient temperatures, corresponding to the positions of the driven member.

4. The drive unit of claim 2, wherein the storing section stores the hysteresis correction values, for different ambient temperatures, corresponding to the positions of the driven member.

5. A movable module, comprising:
a driven member; and
the drive unit of claim 1.

6. The movable module of claim 5, wherein the driven member is an imaging optical system constituting an image pickup apparatus.

7. An autofocus control method for adjusting focus by moving an imaging optical system in a first direction and a second direction opposite to the first direction by contraction of a shape memory alloy caused by electric current through the shape memory alloy, the method comprising:
a resistance measurement step for measuring a resistance of the shape memory alloy;
a moving step for moving the imaging optical system in the first direction by a predetermined moving distance at predetermined intervals in the first direction on the basis of the resistance of the memory shape alloy;
an auto focus data acquisition step for acquiring auto focus data denoting contrasts of an image, depending positions of the imaging optical system;
an auto focus data comparison step for comparing an autofocus datum for a current position of the imaging optical system with an autofocus datum for a position previous to the current position of the imaging optical system;
a reversing step for, when the autofocus datum for the current position of the imaging optical system is smaller than the autofocus datum for the position previous to the current position of the imaging optical system, moving the imaging optical system in the second direction; and
a step for storing hysteresis correction values to be used to correct hysteresis between a case of moving the driven member in the first direction and a case of moving the driven member in the second direction, wherein the hysteresis correction values contain resistance correction values based on a resistance, of the shape memory alloy, corresponding to a target position when the imaging optical system is moved in the first direction and a resistance, of the shape memory alloy, corresponding to the target position when the imaging optical system is moved in the second direction,
wherein the reversing step includes a supply current amount correction step for, after an amount of a supply current for the position previous to the current position of the imaging optical system is corrected on the basis of the hysteresis correction values having been stored, and the shape memory alloy is then supplied with the supply current, correcting an amount of a supply current to be supplied to the shape memory alloy on the basis of a resistance of the shape memory alloy measured in the resistance measurement step, a target resistance corresponding to the target position, and the hysteresis correction values.

8. The autofocus control method of claim 7, wherein in the supply current amount correction step, the amount of the electric current to be supplied to the shape memory alloy is corrected on the basis of a result of a comparison of the target resistance having been corrected on the basis of the hysteresis correction values with the resistance having been measured in the resistance measurement step.

9. An autofocus control method for adjusting focus by moving an imaging optical system in a first direction and a second direction opposite to the first direction by contraction of a shape memory alloy caused by electric current through the shape memory alloy, the method comprising:
a resistance measurement step for measuring a resistance of the shape memory alloy;
a moving step for moving the imaging optical system in the first direction by a predetermined moving distance at predetermined intervals in the first direction on the basis of the resistance of the memory shape alloy;
an auto focus data acquisition step for acquiring auto focus data denoting contrasts of an image, depending positions of the imaging optical system;
an auto focus data comparison step for comparing an autofocus datum for a current position of the imaging optical system with an autofocus datum for a position previous to the current position of the imaging optical system;

a reversing step for, when the autofocus datum for the current position of the imaging optical system is smaller than the autofocus datum for the position previous to the current position of the imaging optical system, moving the imaging optical system in the second direction; and a step for storing hysteresis correction values to be used to correct hysteresis between a case of moving the driven member in the first direction and a case of moving the driven member in the second direction, wherein the hysteresis correction values contain resistance correction values based on a resistance, of the shape memory alloy, corresponding to a target position when the imaging optical system is moved in the first direction and a resistance, of the shape memory alloy, corresponding to the target position when the imaging optical system is moved in the second direction, wherein in the reversing step, an amount of a supply current to be supplied to the shape memory alloy is determined on the basis of a resistance of the shape memory alloy for the current position measured in the resistance measurement step, a target resistance corresponding to the target position, and the hysteresis correction values.

10. The autofocus control method of claim 7, wherein in the reversing step, electric current is supplied to the shape memory alloy on the basis of the result of the comparison of the target resistance having been corrected on the basis of the hysteresis correction values with the resistance having been measured in the resistance measurement step.

11. The autofocus control method of claim 7, wherein in the step for storing hysteresis correction values, the hysteresis correction values corresponding to the positions of the imaging optical system are stored for different ambient temperatures.

12. The autofocus control method of claim 8, wherein in the step for storing hysteresis correction values, the hysteresis correction values corresponding to the positions of the imaging optical system are stored for different ambient temperatures.

13. The autofocus control method of claim 9, wherein in the step for storing hysteresis correction values, the hysteresis correction values corresponding to the positions of the imaging optical system are stored for different ambient temperatures.

14. The autofocus control method of claim 10, wherein in the step for storing hysteresis correction values, the hysteresis correction values corresponding to the positions of the imaging optical system are stored for different ambient temperatures.

* * * * *